United States Patent
Liwerant et al.

(10) Patent No.: US 10,225,584 B2
(45) Date of Patent: *Mar. 5, 2019

(54) SYSTEMS AND METHODS FOR SHARING VIDEO WITH ADVERTISEMENTS OVER A NETWORK

(71) Applicant: VideoShare LLC, Chestnut Hill, MA (US)

(72) Inventors: Gad Liwerant, Chestnut Hill, MA (US); Christopher Dodge, Belmont, MA (US); Guillaume Boissiere, Scottsdale, AZ (US)

(73) Assignee: VIDEOSHARE LLC, Chestnut Hill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,304

(22) Filed: Jun. 9, 2017

(65) Prior Publication Data

US 2017/0359606 A1   Dec. 14, 2017

Related U.S. Application Data

(63) Continuation of application No. 15/094,441, filed on Apr. 8, 2016, now abandoned, which is a continuation
(Continued)

(51) Int. Cl.
*H04N 21/235* (2011.01)
*H04N 21/236* (2011.01)
(Continued)

(52) U.S. Cl.
CPC ... *H04N 21/23424* (2013.01); *H04N 21/2181* (2013.01); *H04N 21/2353* (2013.01);
(Continued)

(58) Field of Classification Search
CPC ......... H04N 21/2358; H04N 21/23614; H04N 21/26258; H04N 21/2668
(Continued)

(56) References Cited

U.S. PATENT DOCUMENTS 4,047,154 A   9/1977   Vitols et al.
4,151,512 A   4/1979   Rignati et al.
(Continued)

FOREIGN PATENT DOCUMENTS

EP   0 696 127 A1   2/1996
EP   0 762 763 A2   3/1997
(Continued)

OTHER PUBLICATIONS

Alvear, Jose, "Q&A With William H. Mutual, President and Chairman of POPcast", Jan. 4, 2000, http://www.streamingmedia.com/Articles/Editoriai/Featured-Articles/Q%26A-With-William-H.-Mutuai-President-and-Chairman-of-POPcast-61919.aspx (last visited Mar. 19, 2015).

(Continued)

*Primary Examiner* — Dominic D Saltarelli
(74) *Attorney, Agent, or Firm* — Buchanan Ingersoll & Rooney PC

(57) ABSTRACT

A user can create a video segment or employ an existing video segment, upload the segment to a server, indicate an advertisement to be associated with the video, and then send it to a recipient over a computer network. The user provides an indication that one or more particular video segments and advertisements are to be shared over the network. An identifier for the video segment is automatically created and the segment and the identifier are automatically uploaded to a host computer over the network such as the Internet. The video segment, the identifier (optionally with other identifying material such as an identity of the sender, and an
(Continued)

advertisement selected by the sender can be stored at the direction of the host computer.

30 Claims, 16 Drawing Sheets

Related U.S. Application Data of application No. 14/597,491, filed on Jan. 15, 2015, now abandoned, which is a continuation of application No. 13/909,876, filed on Jun. 4, 2013, now Pat. No. 8,966,522, which is a continuation of application No. 09/631,583, filed on Aug. 3, 2000, now Pat. No. 8,464,302, which is a continuation-in-part of application No. 09/497,587, filed on Feb. 3, 2000, now abandoned.

(60) Provisional application No. 60/147,029, filed on Aug. 3, 1999.

(51) Int. Cl.
| | | |
|---|---|---|
| *H04N 21/262* | (2011.01) | |
| *H04N 21/2668* | (2011.01) | |
| *H04N 21/234* | (2011.01) | |
| *H04N 21/218* | (2011.01) | |
| *H04N 21/2343* | (2011.01) | |
| *H04N 21/2743* | (2011.01) | |
| *H04N 21/475* | (2011.01) | |
| *H04N 21/4786* | (2011.01) | |
| *H04N 21/81* | (2011.01) | |
| *H04N 21/845* | (2011.01) | |
| *H04N 21/854* | (2011.01) | |
| *H04N 21/858* | (2011.01) | |
| *H04N 21/61* | (2011.01) | |
| *H04L 29/08* | (2006.01) | |

(52) U.S. Cl.
CPC ... *H04N 21/23439* (2013.01); *H04N 21/2743* (2013.01); *H04N 21/4751* (2013.01); *H04N 21/4786* (2013.01); *H04N 21/6125* (2013.01); *H04N 21/812* (2013.01); *H04N 21/8456* (2013.01); *H04N 21/854* (2013.01); *H04N 21/8586* (2013.01); *H04L 67/02* (2013.01); *H04L 67/06* (2013.01)

(58) Field of Classification Search
USPC .................................................. 725/32–36
See application file for complete search history.

(56) References Cited

U.S. PATENT DOCUMENTS

| | | |
|---|---|---|
| 4,485,439 A | 11/1984 | Rothstein |
| 4,777,651 A | 10/1988 | McCann et al. |
| 5,200,749 A | 4/1993 | Crosby et al. |
| 5,339,392 A | 8/1994 | Risberg et al. |
| 5,422,656 A | 6/1995 | Allard et al. |
| 5,537,530 A | 7/1996 | Edgar et al. |
| 5,563,649 A | 10/1996 | Gould et al. |
| 5,608,874 A | 3/1997 | Ogawa et al. |
| 5,623,587 A | 4/1997 | Bulman |
| 5,635,982 A | 6/1997 | Zhang et al. |
| 5,644,714 A | 7/1997 | Kikinis |
| 5,699,458 A | 12/1997 | Sprague |
| 5,712,901 A | 1/1998 | Meermans |
| 5,712,903 A | 1/1998 | Bartholomew |
| 5,752,244 A | 5/1998 | Rose et al. |
| 5,794,210 A | 8/1998 | Goldhaber et al. |
| 5,822,436 A | 10/1998 | Rhoads |
| 5,841,978 A | 11/1998 | Rhoads |
| 5,862,260 A | 1/1999 | Rhoads |
| 5,867,494 A | 2/1999 | Krishnaswamy et al. |
| 5,896,444 A | 4/1999 | Perlman et al. |
| 5,898,833 A | 4/1999 | Kidder |
| 5,911,776 A | 6/1999 | Guck |
| 5,918,013 A | 6/1999 | Mighdoll et al. |
| 5,918,014 A | 6/1999 | Robinson |
| 5,953,506 A | 9/1999 | Kalra et al. |
| 5,956,716 A | 9/1999 | Kenner et al. |
| 5,963,203 A | 10/1999 | Goldberg et al. |
| 5,978,819 A | 11/1999 | Berstis |
| 5,999,525 A | 12/1999 | Kirishnaswamy et al. |
| 6,006,265 A | 12/1999 | Rangan et al. |
| 6,026,371 A | 2/2000 | Beck et al. |
| 6,034,689 A | 3/2000 | White et al. |
| 6,044,376 A | 3/2000 | Kurtzman, II |
| 6,057,847 A | 5/2000 | Jenkins |
| 6,073,168 A | 6/2000 | Mighdoll et al. |
| 6,092,120 A | 7/2000 | Swaminathan et al. |
| 6,093,880 A | 7/2000 | Arnolds |
| 6,111,582 A | 8/2000 | Jenkins |
| 6,111,954 A | 8/2000 | Rhoads |
| 6,115,035 A | 9/2000 | Compton et al. |
| 6,122,403 A | 9/2000 | Rhoads |
| 6,154,771 A | 11/2000 | Rangan et al. |
| 6,161,137 A | 12/2000 | Ogdon et al. |
| 6,188,398 B1 | 2/2001 | Collins-Rector et al. |
| 6,188,428 B1 | 2/2001 | Koz et al. |
| 6,205,407 B1 | 3/2001 | Testa et al. |
| 6,223,213 B1 | 4/2001 | Cleron et al. |
| 6,226,030 B1 | 5/2001 | Harvey et al. |
| 6,230,697 B1 | 5/2001 | Itoyama et al. |
| 6,236,395 B1 | 5/2001 | Sezan et al. |
| 6,251,014 B1 | 6/2001 | Stockdale et al. |
| 6,263,022 B1 | 7/2001 | Chen et al. |
| 6,269,394 B1 | 7/2001 | Kenner et al. |
| 6,285,984 B1 | 9/2001 | Speicher et al. |
| 6,300,888 B1 | 10/2001 | Chen et al. |
| 6,311,197 B2 | 10/2001 | Mighdoll et al. |
| 6,311,207 B1 | 10/2001 | Mighdoll et al. |
| 6,314,466 B1 | 11/2001 | Agarwal et al. |
| 6,317,760 B1 | 11/2001 | Byrd et al. |
| 6,324,573 B1 | 11/2001 | Rhoads |
| 6,332,157 B1 | 12/2001 | Mighdoll et al. |
| 6,332,163 B1 | 12/2001 | Bowman-Amuah |
| 6,335,927 B1 | 1/2002 | Elliott et al. |
| 6,337,743 B1 | 1/2002 | Brown et al. |
| 6,338,044 B1 | 1/2002 | Cook et al. |
| 6,338,082 B1 | 1/2002 | Schneider |
| 6,339,761 B1 | 1/2002 | Cottingham |
| 6,351,265 B1 | 2/2002 | Bulman |
| 6,360,234 B2 | 3/2002 | Jain et al. |
| 6,369,835 B1 | 4/2002 | Lin |
| 6,370,487 B1 | 4/2002 | Dorough |
| 6,374,260 B1 | 4/2002 | Hoffert et al. |
| 6,377,930 B1 | 4/2002 | Chen et al. |
| 6,381,362 B1 | 4/2002 | Deshpande et al. |
| 6,400,816 B1 | 6/2002 | Hjalmtysson et al. |
| 6,408,331 B1 | 6/2002 | Rhoads |
| 6,411,685 B1 | 6/2002 | O'Neal |
| 6,411,725 B1 | 6/2002 | Rhoads |
| 6,412,004 B1 | 6/2002 | Chen et al. |
| 6,430,175 B1 | 8/2002 | Echols et al. |
| 6,434,568 B1 | 8/2002 | Bowman-Amuah |
| 6,438,231 B1 | 8/2002 | Rhoads |
| 6,438,594 B1 | 8/2002 | Bowman-Amuah |
| 6,442,549 B1 | 8/2002 | Schneider |
| 6,442,598 B1 | 8/2002 | Wright et al. |
| 6,463,461 B1 | 10/2002 | Hanson et al. |
| 6,466,971 B1 | 10/2002 | Humpleman et al. |
| 6,473,778 B1 | 10/2002 | Gibbon |
| 6,477,580 B1 | 11/2002 | Bowman-Amuah |
| 6,487,663 B1 | 11/2002 | Jaisimha |
| 6,489,980 B1 | 12/2002 | Scott et al. |
| 6,499,060 B1 | 12/2002 | Wang et al. |
| 6,503,147 B1 | 1/2003 | Stockdale et al. |
| 6,505,160 B1 | 1/2003 | Levy et al. |
| 6,505,232 B1 | 1/2003 | Mighdoll et al. |
| 6,523,022 B1 | 2/2003 | Hobbs |

(56) References Cited

U.S. PATENT DOCUMENTS

| | | |
|---|---|---|
| 6,526,335 B1 | 2/2003 | Treyz et al. |
| 6,529,909 B1 | 3/2003 | Bowman-Amuah |
| 6,529,948 B1 | 3/2003 | Bowman-Amuah |
| 6,539,354 B1 | 3/2003 | Sutton et al. |
| 6,539,396 B1 | 3/2003 | Bowman-Amuah |
| 6,542,602 B1 | 4/2003 | Elazar |
| 6,546,419 B1 | 4/2003 | Humpleman et al. |
| 6,546,427 B1 | 4/2003 | Ehrlich et al. |
| 6,546,555 B1 | 4/2003 | Hjelsvold et al. |
| 6,549,612 B2 | 4/2003 | Gifford et al. |
| 6,549,922 B1 | 4/2003 | Srivastava et al. |
| 6,549,949 B1 | 4/2003 | Bowman-Amuah |
| 6,564,380 B1 | 5/2003 | Murphy |
| 6,570,585 B1 | 5/2003 | Hines et al. |
| 6,573,907 B1 | 6/2003 | Madrane |
| 6,577,746 B1 | 6/2003 | Evans et al. |
| 6,580,431 B1 | 6/2003 | Deosaran et al. |
| 6,601,234 B1 | 7/2003 | Bowman-Amuah |
| 6,606,744 B1 | 8/2003 | Mikurak |
| 6,608,933 B1 | 8/2003 | Dowell et al. |
| 6,636,888 B1 | 10/2003 | Bookspan et al. |
| 6,640,238 B1 | 10/2003 | Bowman-Amuah |
| 6,650,761 B1 | 11/2003 | Rodriguez et al. |
| 6,662,218 B2 | 12/2003 | Mighdoll et al. |
| 6,665,835 B1 | 12/2003 | Gutfreund et al. |
| 6,671,818 B1 | 12/2003 | Mikurak |
| 6,694,352 B1 | 2/2004 | Omoigui |
| 6,697,569 B1 | 2/2004 | Gomez et al. |
| 6,711,474 B1 | 3/2004 | Treyz et al. |
| 6,728,753 B1 | 4/2004 | Parasnis et al. |
| 6,731,625 B1 | 5/2004 | Eastep et al. |
| 6,732,151 B1 | 5/2004 | Tobias et al. |
| 6,741,737 B1 | 5/2004 | Lenoir |
| 6,754,181 B1 | 6/2004 | Elliott et al. |
| 6,760,746 B1 | 7/2004 | Schneider |
| 6,760,916 B2 | 7/2004 | Holtz et al. |
| 6,771,766 B1 | 8/2004 | Shafiee et al. |
| 6,774,926 B1 | 8/2004 | Ellis et al. |
| 6,775,392 B1 | 8/2004 | Rhoads |
| 6,778,760 B1 | 8/2004 | Kagle |
| 6,788,982 B1 | 9/2004 | Lapstun et al. |
| 6,789,228 B1 | 9/2004 | Merril et al. |
| 6,820,277 B1 | 11/2004 | Eldering et al. |
| 6,829,368 B2 | 12/2004 | Meyer et al. |
| 6,842,190 B1 | 1/2005 | Lord et al. |
| 6,857,132 B1 | 2/2005 | Rakib et al. |
| 6,862,260 B2 | 3/2005 | Okazaki |
| 6,868,395 B1 | 3/2005 | Szlam et al. |
| 6,873,877 B1 | 3/2005 | Tobias et al. |
| 6,877,134 B1 | 4/2005 | Fuller et al. |
| 6,895,430 B1 | 5/2005 | Schneider |
| 6,895,557 B1 | 5/2005 | Wood et al. |
| 6,899,627 B2 | 5/2005 | Lam et al. |
| 6,901,436 B1 | 5/2005 | Schneider |
| 6,909,708 B1 | 6/2005 | Krishnaswamy et al. |
| 6,911,592 B1 | 6/2005 | Futamase et al. |
| 6,917,965 B2 | 7/2005 | Gupta et al. |
| 6,928,655 B1 | 8/2005 | Omoigui |
| 6,947,571 B1 | 9/2005 | Rhoads et al. |
| 6,956,593 B1 | 10/2005 | Gupta et al. |
| 6,957,260 B1 | 10/2005 | Mighdoll et al. |
| 6,959,079 B2 | 10/2005 | Elazar |
| 6,959,339 B1 | 10/2005 | Wu et al. |
| 6,963,906 B2 | 11/2005 | Portuesi |
| 6,965,682 B1 | 11/2005 | Davis et al. |
| 6,967,276 B2 | 11/2005 | Futamase et al. |
| 6,968,394 B1 | 11/2005 | El-Rafie |
| 6,970,127 B2 | 11/2005 | Rakib |
| 6,973,436 B1 | 12/2005 | Shkedi |
| 6,973,505 B1 | 12/2005 | Schneider |
| 6,981,050 B1 * | 12/2005 | Tobias .............. H04L 29/06027 348/E7.071 |
| 7,017,173 B1 | 3/2006 | Armstrong et al. |
| 7,032,030 B1 | 4/2006 | Codignotto |
| 7,039,599 B2 | 5/2006 | Merriman et al. |
| 7,043,532 B1 | 5/2006 | Humpleman et al. |
| 7,047,305 B1 | 5/2006 | Brooks et al. |
| 7,050,603 B2 | 5/2006 | Rhoads et al. |
| 7,051,275 B2 | 5/2006 | Gupta et al. |
| 7,069,573 B1 | 6/2006 | Brooks et al. |
| 7,089,579 B1 | 8/2006 | Mao et al. |
| 7,093,191 B1 | 8/2006 | Jain et al. |
| 7,114,174 B1 | 9/2006 | Brooks et al. |
| 7,119,268 B2 | 10/2006 | Futamase et al. |
| 7,124,101 B1 | 10/2006 | Mikurak |
| 7,130,807 B1 | 10/2006 | Mikurak |
| 7,136,932 B1 | 11/2006 | Schneider |
| 7,143,177 B1 | 11/2006 | Johnson et al. |
| 7,143,428 B1 | 11/2006 | Bruck et al. |
| 7,143,432 B1 | 11/2006 | Brooks et al. |
| 7,145,898 B1 | 12/2006 | Elliott |
| 7,146,408 B1 | 12/2006 | Crater et al. |
| 7,149,359 B1 | 12/2006 | Omoigui |
| 7,155,663 B2 | 12/2006 | Landsman et al. |
| 7,158,676 B1 | 1/2007 | Rainsford |
| 7,161,081 B2 | 1/2007 | Futamase et al. |
| 7,162,690 B2 | 1/2007 | Gupta et al. |
| 7,171,016 B1 | 1/2007 | Rhoads |
| 7,171,018 B2 | 1/2007 | Rhoads et al. |
| 7,218,978 B2 | 5/2007 | Laptsun et al. |
| 7,277,767 B2 | 10/2007 | Yuen et al. |
| 7,305,472 B2 | 12/2007 | Mighdoll et al. |
| 7,330,875 B1 | 2/2008 | Parasnis et al. |
| 7,339,993 B1 | 3/2008 | Brooks et al. |
| 7,351,147 B2 | 4/2008 | Stockdale et al. |
| 7,412,533 B1 | 8/2008 | Johnson et al. |
| 7,499,765 B2 | 3/2009 | Lapstun et al. |
| 7,505,605 B2 | 3/2009 | Rhoads et al. |
| 7,514,624 B2 | 4/2009 | Futamase et al. |
| 7,552,228 B2 | 6/2009 | Parasnis et al. |
| 7,526,300 B2 | 7/2009 | Tobias et al. |
| 7,562,300 B1 | 7/2009 | Tobias et al. |
| 7,562,392 B1 | 7/2009 | Rhoads et al. |
| 7,577,273 B2 | 8/2009 | Rhoads et al. |
| 7,587,602 B2 | 9/2009 | Rhoads |
| 7,593,576 B2 | 9/2009 | Meyer et al. |
| 7,596,606 B2 | 9/2009 | Codignotto |
| 7,664,794 B2 | 2/2010 | Kasmirsky et al. |
| 7,685,247 B2 | 3/2010 | Codignotto |
| 7,689,658 B2 | 3/2010 | Codignotto |
| 7,689,898 B2 | 3/2010 | Merril et al. |
| 7,698,372 B2 | 4/2010 | Codignotto |
| 7,704,147 B2 | 4/2010 | Quraishi et al. |
| 7,716,077 B1 | 5/2010 | Mikurak |
| 7,810,123 B1 | 10/2010 | Prestoy |
| 7,853,711 B1 | 12/2010 | Johnson et al. |
| 7,859,551 B2 | 12/2010 | Bulman et al. |
| 7,869,425 B2 | 1/2011 | Elliott et al. |
| 7,877,774 B1 | 1/2011 | Basso et al. |
| 7,987,492 B2 | 7/2011 | Liwerant et al. |
| RE42,728 E | 9/2011 | Madrane |
| 8,275,661 B1 | 9/2012 | Ponte et al. |
| 8,392,532 B2 | 3/2013 | Wood et al. |
| 8,434,123 B2 | 4/2013 | Liwerant et al. |
| 8,438,608 B2 | 5/2013 | Liwerant et al. |
| 8,453,190 B2 | 5/2013 | Liwerant et al. |
| 8,464,302 B1 | 6/2013 | Liwerant et al. |
| 8,966,522 B2 | 2/2015 | Liwerant et al. |
| 9,204,194 B2 | 12/2015 | Liwerant et al. |
| 2001/0003823 A1 | 6/2001 | Mighdoll et al. |
| 2001/0003829 A1 | 6/2001 | Romine |
| 2001/0018693 A1 | 8/2001 | Jain et al. |
| 2001/0027412 A1 | 10/2001 | Son |
| 2001/0031066 A1 | 10/2001 | Meyer et al. |
| 2001/0037284 A1 | 11/2001 | Finkelstein et al. |
| 2001/0047294 A1 | 11/2001 | Rothschild |
| 2001/0052019 A1 | 12/2001 | Walters et al. |
| 2002/0013852 A1 | 1/2002 | Janik |
| 2002/0019984 A1 | 2/2002 | Rakib |
| 2002/0031120 A1 | 3/2002 | Rakib |
| 2002/0033844 A1 | 3/2002 | Levy et al. |
| 2002/0036694 A1 | 3/2002 | Merril |
| 2002/0044225 A1 | 4/2002 | Rakib |
| 2002/0049852 A1 | 4/2002 | Lee et al. |

(56) References Cited

U.S. PATENT DOCUMENTS

| | | |
|---|---|---|
| 2002/0053078 A1 | 5/2002 | Holtz et al. |
| 2002/0056119 A1 | 5/2002 | Moynihan |
| 2002/0056123 A1 | 5/2002 | Liwerant et al. |
| 2002/0057287 A1 | 5/2002 | Crow et al. |
| 2002/0059637 A1 | 5/2002 | Rakib |
| 2002/0064149 A1 | 5/2002 | Elliott et al. |
| 2002/0010759 A1 | 6/2002 | Hitson et al. |
| 2002/0090114 A1 | 7/2002 | Rhoads et al. |
| 2002/0120849 A1 | 8/2002 | McKinley et al. |
| 2002/0129151 A1 | 9/2002 | Yuen et al. |
| 2002/0135611 A1 | 9/2002 | Deosaran et al. |
| 2002/0152305 A1 | 10/2002 | Jackson et al. |
| 2003/0001846 A1 | 1/2003 | Davis et al. |
| 2003/0012403 A1 | 1/2003 | Rhoads et al. |
| 2003/0015599 A1 | 1/2003 | Carroll, III et al. |
| 2003/0028380 A1 | 2/2003 | Freeland et al. |
| 2003/0051255 A1 | 3/2003 | Bulman et al. |
| 2003/0058277 A1 | 3/2003 | Bowman-Amuah |
| 2003/0149993 A1 | 8/2003 | Son et al. |
| 2003/0196164 A1 | 10/2003 | Gupta et al. |
| 2003/0200859 A1 | 10/2003 | Futamase et al. |
| 2003/0205125 A1 | 11/2003 | Futamase et al. |
| 2003/0224767 A1 | 12/2003 | Futamase et al. |
| 2004/0007120 A1 | 1/2004 | Futamase et al. |
| 2004/0064351 A1 | 4/2004 | Mikurak |
| 2004/0078825 A1 | 4/2004 | Murphy |
| 2004/0193740 A1 | 9/2004 | Kasmirsky et al. |
| 2004/0253945 A1 | 12/2004 | Janik |
| 2004/0254013 A1 | 12/2004 | Quraishi |
| 2005/0002514 A1 | 1/2005 | Shafiee et al. |
| 2005/0091268 A1 | 4/2005 | Meyer et al. |
| 2005/0058319 A1 | 5/2005 | Rhoads et al. |
| 2005/0188086 A1 | 8/2005 | Mlghdoll et al. |
| 2005/0210101 A1 | 9/2005 | Janik |
| 2005/0246752 A1 | 11/2005 | Liwerant |
| 2005/0273508 A1 | 12/2005 | Humpelman et al. |
| 2006/0012813 A1 | 1/2006 | Lapstun et al. |
| 2006/0015201 A1 | 1/2006 | Lapstun et al. |
| 2006/0035713 A1 | 2/2006 | Cockerille et al. |
| 2006/0133645 A1 | 6/2006 | Rhoads et al. |
| 2006/0143307 A1 | 6/2006 | Codignotto |
| 2006/0143560 A1 | 6/2006 | Gupta et al. |
| 2006/0149813 A1 | 7/2006 | Janik |
| 2006/0178918 A1 | 8/2006 | Mikurak |
| 2007/0005795 A1 | 1/2007 | Gonzalez |
| 2007/0033528 A1 | 2/2007 | Merril et al. |
| 2008/0022009 A1 | 1/2008 | Yuen et al. |
| 2008/0059607 A1 | 3/2008 | Schneider |
| 2008/0095339 A1 | 4/2008 | Elliott et al. |
| 2008/0126943 A1 | 5/2008 | Parasnis et al. |
| 2008/0147786 A1 | 6/2008 | Liwerant et al. |
| 2008/0148330 A1 | 6/2008 | Liwerant et al. |
| 2008/0155010 A1 | 6/2008 | Liwerant et al. |
| 2008/0155063 A1 | 6/2008 | Liwerant et al. |
| 2008/0155625 A1 | 6/2008 | Liwerant et al. |
| 2008/0155629 A1 | 6/2008 | Liwerant et al. |
| 2008/0155631 A1 | 6/2008 | Liwerant et al. |
| 2008/0163315 A1 | 7/2008 | Liwerant et al. |
| 2008/0163316 A1 | 7/2008 | Liwerant et al. |
| 2008/0163321 A1 | 7/2008 | Liwerant et al. |
| 2008/0172705 A1 | 7/2008 | Liwerant et al. |
| 2008/0216131 A1 | 9/2008 | Liwerant et al. |
| 2008/0216139 A1 | 9/2008 | Liwerant et al. |
| 2008/0216140 A1 | 9/2008 | Liwerant et al. |
| 2008/0256583 A1 | 10/2008 | Liwerant et al. |
| 2008/0307040 A1 | 12/2008 | Liwerant et al. |
| 2008/0307475 A1 | 12/2008 | Liwerant et al. |
| 2009/0046321 A1 | 2/2009 | Lapstun et al. |
| 2009/0093897 A1 | 4/2009 | Lapstun et al. |
| 2009/0109959 A1 | 4/2009 | Elliot et al. |
| 2009/0262975 A1 | 10/2009 | Rhoads et al. |
| 2009/0298490 A9 | 12/2009 | Janik |
| 2010/0008586 A1 | 1/2010 | Meyer et al. |
| 2010/0014649 A1 | 1/2010 | Codignotto |
| 2010/0017493 A1 | 1/2010 | Codignotto |
| 2010/0017864 A1 | 1/2010 | Codignotto |
| 2010/0046744 A1 | 2/2010 | Rhoads et al. |
| 2010/0138012 A1 | 6/2010 | Rhoads |
| 2010/0138459 A1 | 6/2010 | Kasmirsky et al. |
| 2010/0150446 A1 | 6/2010 | Codignotto |
| 2010/0322035 A1 | 12/2010 | Rhoads et al. |
| 2010/0328465 A1 | 12/2010 | Merril et al. |
| 2011/0265135 A1 | 10/2011 | Liwerant et al. |
| 2013/0212631 A1 | 8/2013 | Liwerant et al. |
| 2013/0283312 A1 | 10/2013 | Liwerant et al. |
| 2015/0128172 A1 | 5/2015 | Liwerant et al. |
| 2015/0172350 A1 | 6/2015 | Liwerant et al. |
| 2017/0054781 A1 | 2/2017 | Liwerant et al. |
| 2017/0055010 A1 | 2/2017 | Liwerant et al. |

FOREIGN PATENT DOCUMENTS

| | | |
|---|---|---|
| EP | 0 811 935 A2 | 12/1997 |
| EP | 0 811 939 A2 | 12/1997 |
| EP | 0 927 985 A2 | 7/1999 |
| EP | 1 073 034 A2 | 1/2001 |
| EP | 1 084 576 A2 | 3/2001 |
| EP | 1 112 656 A2 | 7/2001 |
| EP | 1 142 129 A1 | 10/2001 |
| EP | 1 142 130 A1 | 10/2001 |
| EP | 1 330 038 A1 | 7/2003 |
| EP | 1 330 039 A1 | 7/2003 |
| EP | 2 101 453 A2 | 9/2009 |
| WO | WO 96/32802 A1 | 10/1996 |
| WO | WO 96/41285 A1 | 12/1996 |
| WO | WO 97/09708 A1 | 3/1997 |
| WO | WO 97/12486 A1 | 4/1997 |
| WO | WO 97/46943 A1 | 12/1997 |
| WO | WO 98/16045 A1 | 4/1998 |
| WO | WO 98/23080 A2 | 5/1998 |
| WO | WO 98/34391 A2 | 8/1998 |
| WO | WO 98/45045 A1 | 10/1998 |
| WO | WO 98/47298 A2 | 10/1998 |
| WO | WO 1999/010822 | 3/1999 |
| WO | WO 99/16201 A2 | 4/1999 |
| WO | WO 99/22502 A2 | 5/1999 |
| WO | WO 99/41684 A1 | 6/1999 |
| WO | WO 99/57837 A2 | 11/1999 |
| WO | WO 99/57838 A2 | 11/1999 |
| WO | WO 99/57839 A2 | 11/1999 |
| WO | WO 00/10099 A1 | 2/2000 |
| WO | WO 00/14686 A1 | 3/2000 |
| WO | WO 00/16550 A2 | 3/2000 |
| WO | WO 00/20960 A1 | 4/2000 |
| WO | WO 00/36752 A1 | 6/2000 |
| WO | WO 00/36754 A1 | 6/2000 |
| WO | WO 00/44169 A1 | 7/2000 |
| WO | WO 00/45573 A1 | 8/2000 |
| WO | WO 00/45599 A2 | 8/2000 |
| WO | WO 00/48399 A1 | 8/2000 |
| WO | WO 00/49535 A2 | 8/2000 |
| WO | WO 00/51310 A1 | 8/2000 |
| WO | WO 00/72534 A1 | 11/2000 |
| WO | WO 00/76218 A1 | 12/2000 |
| WO | WO 00/76219 A1 | 12/2000 |
| WO | WO 00/76220 A1 | 12/2000 |
| WO | WO 01/01300 A1 | 1/2001 |
| WO | WO 01/10126 A1 | 2/2001 |
| WO | WO 01/10127 A1 | 2/2001 |
| WO | WO 01/10128 A1 | 2/2001 |
| WO | WO 01/13277 A2 | 2/2001 |
| WO | WO 01/13637 A1 | 2/2001 |
| WO | WO 01/14981 A1 | 3/2001 |
| WO | WO 01/16694 A1 | 3/2001 |
| WO | WO 01/17253 A1 | 3/2001 |
| WO | WO 01/22688 A1 | 3/2001 |
| WO | WO 01/25948 A1 | 4/2001 |
| WO | WO 01/26377 A1 | 4/2001 |
| WO | WO 01/26760 A2 | 4/2001 |
| WO | WO 01/27711 A2 | 4/2001 |
| WO | WO 01/27811 A1 | 4/2001 |
| WO | WO 01/28249 A1 | 4/2001 |
| WO | WO 01/31497 A1 | 5/2001 |
| WO | WO 01/39028 A2 | 5/2001 |

(56) References Cited

FOREIGN PATENT DOCUMENTS

| | | |
|---|---|---|
| WO | WO 01/39029 A2 | 5/2001 |
| WO | WO 01/39030 A2 | 5/2001 |
| WO | WO 01/39082 A2 | 5/2001 |
| WO | WO 01/40963 A1 | 6/2001 |
| WO | WO 01/41393 A2 | 6/2001 |
| WO | WO 01/41446 A1 | 6/2001 |
| WO | WO 01/50225 A2 | 7/2001 |
| WO | WO 01/50233 A1 | 7/2001 |
| WO | WO 01/55889 A1 | 8/2001 |
| WO | WO 01/57851 A1 | 8/2001 |
| WO | WO 01/58165 A2 | 8/2001 |
| WO | WO 01/59645 A1 | 8/2001 |
| WO | WO 01/60039 A2 | 10/2001 |

OTHER PUBLICATIONS

Alvear, Jose, "ShareYourWorld and Make Money from Your Home Videos", Mar. 7, 2000, http://www.streamingmedia.com/Articles/Editoriai/Featured-Articles/ShareYourWorld-and-Make-Money-from-Your-Home-Videos-62098.aspx (last visited May 20, 2015).

Bargeron, David, et al., "Annotations for Streaming Video on the Web: System Design and Usage Studies", Computer Networks, vol. 31, 1999, pp. 1139-1153, Microsoft Research, Elsevier Science B.V., Redmond, WA, USA.

Brassil, Jack, et al., "Program Insertion in Real-Time IP Multicasts", ACM SIGCOMM Computer Communication Review, vol. 29, Issue 2, Apr. 1999, pp. 49-68, ACM New York, NY, USA, Apr. 1, 1999.

Buddhikot, Milind M., "Project Mars: Scalable, High Performance, Web Based Multimedia-on-Demand (MOD) Services and Servers", Dissertation, Aug. 1998, Washington University Sever Institute of Technology, Saint Louis, MO, USA.

Chang, Shih-Fu, et al., "Next Generation Content Representation, Creation, and Searching for New-Media Applications in Education", Invited Paper, Proceedings of the IEEE, vol. 86, No. 5, pp. 884-904, May 1998.

"Ciick2Asia.com Community to Share Video 'Powered by POPcast'", http://www.pmewswire.com/news-releases/ckick2asiacom-community-to-share-video-powered-by-popcast-73002512.html, Mar. 8, 2000 (last visited Apr. 3, 2015).

England, Paul, et al., "RAVE: Real-Time Services for the Web", Fifth International World Wide Web Conference, May 6-10, 1996, Paris, France.

Gilmore, Kathryn, "ShareYourWorld.com to be Introduced at Upside's Showcase Conference", http://web.archive.org/web/20000302232835/http://www.shareyourworld.com/press/showcase.phtml, Jan. 24, 2000 (last visited Mar. 2, 2000).

Hjelsvold, Rune, et al., "Databases for Video Information Sharing", In Proceedings of the IS&T/SPIE's Symposium on Electronic Imaging: Science & Technology, San Jose, CA, Feb. 5-10, 1994.

Hjelsvold, Rune, et al., "Modelling and Querying Video Data", In Proceedings of the 2oth International Conference on Very Large Data Bases, Santiago, Chile, 1994.

JIGA Image Exchange Technology, "Series B Preferred Stock Confidential Private Placement Offering Materials", San Francisco, CA, USA, Jan. 2001.

Jung, Helen, "Where Money and Brains go to Meet", The Seattle Times Inside Technology Column, Seattle, Washington, USA, Oct. 26, 1999, http://web.b.ebscohost.com/ehost/detail?sid=6b4cf02d-8004-4c91_a27f- . . . , last visited Apr. 28, 2014.

Mahwah, N.J., "Sharp and Popcast Announce Free Webcasting Service for Internet Viewcam Customers", Business Wire, Aug. 30, 1999, http:l/ezproxy.reinhardt.edu:2048/login?url=http://ezproxy.reinhardt.edu:2218/docview/446018219?accountid=13483, (last visited Apr. 14, 2014).

Moore, Keith, "POPcastCommunications Corp. Launches Free, Self-Service Personal Webcasting; Company Also Enters into Agreement to Acquire Leading Webcaster ITV.net", PR Newswire, Dec. 6, 1999, http://ezproxy. reinhardt.edu:2218/docview/449460882/fulltext/4DC4456517A84EE4PQ/6?accountid=13483, (last visited Apr. 14, 2014).

Muratore, Stephen, "Popcast Launches Free, Self-Service Personal Video Webcasting", Streamingmedia Conference, San Jose Convention Center, Dec. 9, 1999, http://www.videomaker.com/videonews/1999/12/popcast-launches-free-self-service-personal-video-webcasting-at-streamingmedia-conference (last visited May 21, 2015).

Needleman, Rafe, "I'm Ready for my Close-Up", Redherring.com, Mar. 6, 2000, http://web.archive.org/ web/20000815081753/http://www.redherring.com (last visited Apr. 28, 2014).

Pan, Pengkai, "I-Views, a Storymaking Community of, by and for the Audience", Thesis, Sep. 1999, Massachusetts Institute of Technology, Boston, MA, USA.

Pua, Kok Meng, "Prototyping the VISION Digital Video Library System", Thesis, University of Kansas, USA.

Shamah, David, "User Friendly: [Daily Edition]", Jerusalem Post, Jerusalem, Israel, Mar. 5, 2000, http://ezproxy.reinhardt.edu:2048/login?url=http://ezproxy.reinhardt.edu:2218/docview/319275318?accountid=13483, (last visited Apr. 14, 2014.

About, www.shareyourworld.com, http:l/web.archive.org/web/20000229135009/http://www.shareyourworld.com/about.phtml, Feb. 29, 2000.

Buyers, www.shareyourworld. com, http :!/web .archive. org/web/20000229184 71 0/http :l/www.shareyourworld .com/ buyer.phtml, Feb. 29, 2000.

Home Page, www.shareyourworld.com, http:l/web.archive.org/web/20000229122533/http://www.shareyourworld.com, Feb. 29, 2000 (last visited Aug. 23, 2013).

Sellers, www.shareyourworld.com, http:l/web.archive.org/web/20000304092302/http://www.shareyourworld.com/seller. phtml, Mar. 4, 2000.

U.S. Appl. No. 15/971,881, Gad Liwerant, Christopher Dodge and Guillaume Boissiere, filed May 4, 2018.

U.S. Appl. No. 15/971,881, Liwerant et al.

RealVideo Content Creation guide; Dec. 6, 1997; p. 39.

Defendants' Initial Invalidity Contentions, *VideoShare, LLC* v. *Google Inc.* and *Youtube, LLC*, United States District Court for the District of Delaware, C.A. No. 13-990-GMS / *VideoShare, LLC* v. *Viddler, Inc.* United States District Court for the District of Delaware, C.A. No. 13-991-GMS / *VideoShare, LLC* v. *Vimeo, LLC.*, United States District Court for the District of Delaware, C.A. No. 13-992-GMS, dated Apr. 1, 2015, 21 pages (Document 1).

Defendants' Initial Invalidity Contentions vol. 1—Exhibit A1-A15, *VideoShare, LLC* v. *Google Inc.* and *Youtube, LLC*, United States District Court for the District of Delaware, C.A. No. 13-990-GMS / *VideoShare, LLC* v. *Viddler, Inc.*, United States District Court for the District of Delaware, C.A. No. 13-991-GMS / *VideoShare, LLC* v. *Vimeo, LLC.*, United States District Court for the District of Delaware, C.A. No. 13-992-GMS, dated Apr. 1, 2015, 843 pages.

Defendants' Initial Invalidity Contentions vol. 2—Exhibit A16-A27, *VideoShare, LLC* v. *Google Inc.* and *Youtube, LLC*, United States District Court for the District of Delaware, C.A. No. 13-990-GMS / *VideoShare, LLC* v. *Viddler, Inc.*, United States District Court for the District of Delaware, C.A. No. 13-991-GMS / *VideoShare, LLC* v. *Vimeo, LLC.*, United States District Court for the District of Delaware, C.A. No. 13-992-GMS, dated Apr. 1, 2015, 587 pages.

Defendants' Initial Invalidity Contentions vol. 3—Exhibit B1-B16, *VideoShare, LLC* v. *Google Inc.* and *Youtube, LLC*, United States District Court for the District of Delaware, C.A. No. 13-990-GMS / *VideoShare, LLC* v. *Viddler, Inc.*, United States District Court for the District of Delaware, C.A. No. 13-991-GMS / *VideoShare, LLC* v. *Vimeo, LLC.*, United States District Court for the District of Delaware, C.A. No. 13-992-GMS, dated Apr. 1, 2015, 856 pages.

Defendants' Initial Invalidity Contentions vol. 4—Exhibit B17-B28 and C1-C2, *VideoShare, LLC* v. *Google Inc.* and *Youtube, LLC*, United States District Court for the District of Delaware, C.A. No. 13-990-GMS / *VideoShare, LLC* v. *Viddler, Inc.*, United States District Court for the District of Delaware, C.A. No. 13-991-GMS / *VideoShare, LLC* v. *Vimeo, LLC.*, United States District Court for the District of Delaware, C.A. No. 13-992-GMS, dated Apr. 1, 2015, 831 pages.

(56) References Cited

OTHER PUBLICATIONS

Videoshare's Objections and Response to Defendant's First Set of Interrogatories, *VideoShare, LLC* v. *Google Inc.* and *Youtube, LLC*, United States District Court for the District of Delaware, C.A. No. 13-cv-990-GMS / *Videoshare, LLC* v. *Viddler, Inc.*, United States District Court for the District of Delaware, C.A. No. 13-cv-991-GMS / *Videoshare, LLC* v. *Vimeo, LLC.*, United States District Court for the District of Delaware, C.A. No. 13-cv-992-GMS, dated Apr. 24, 2015, 428 pages.

Defendants' Supplemental Invalidity Contentions, *VideoShare, LLC* v. *Google Inc.* and *Youtube, LLC*, United States District Court for the District of Delaware, C.A. No. 13-990-GMS / *VideoShare, LLC* v. *Vimeo, LLC.*, United States District Court for the District of Delaware, C.A. No. 13-992-GMS, dated Oct. 30, 2015, 21 pages (Document 2).

Defendants' Second Supplemental Invalidity Contentions, *VideoShare, LLC* v. *Google Inc.* and *Youtube, LLC*, United States District Court for the District of Delaware, C.A. No. 13-990-GMS / *VideoShare, LLC* v. *Vimeo, LLC.*, United States District Court for the District of Delaware, C.A. No. 13-992-GMS, dated Mar. 16, 2016, 50 pages (Document 3).

Defendants' Third Supplemental Invalidity Contentions, *VideoShare, LLC* v. *Google Inc.* and *Youtube, LLC*, United States District Court for the District of Delaware, C.A. No. 13-990-GMS / *VideoShare, LLC* v. *Vimeo, LLC.*, United States District Court for the District of Delaware, C.A. No. 13-992-GMS, dated Mar. 24, 2016, 57 pages (Document 4).

Videoshare's Opening Claim Construction Brief, *VideoShare, LLC* v. *Google Inc.* and *Youtube, LLC*, United States District Court for the District of Delaware, C.A. No. 13-cv-990-GMS / *VideoShare, LLC* v. *Vimeo, LLC.*, United States District Court for the District of Delaware, C.A. No. 13-cv-992-GMS, dated Aug. 21, 2015, 27 pages (Document 54).

Defendants' Opening Claim Construction Brief, *VideoShare, LLC* v. *Google Inc.* and *Youtube, LLC*, United States District Court for the District of Delaware, C.A. No. 13-cv-990-GMS / *Videoshare, LLC* v. *Vimeo, LLC.*, United States District Court for the District of Delaware, C.A. No. 13-cv-992-GMS, dated Aug. 21, 2015, 25 pages (Document 56).

Videoshare's Reply Claim Construction Brief, *VideoShare, LLC* v. *Google Inc.* and *Youtube, LLC*, United States District Court for the District of Delaware, C.A. No. 13-cv-990-GMS / *Videoshare, LLC* v. *Vimeo, LLC.*, United States District Court for the District of Delaware, C.A. No. 13-cv-992-GMS, dated Sep. 18, 2015, 15 pages (Document 60).

Defendants' Responsive Claim Construction Brief, *VideoShare, LLC* v. *Google Inc.* and *Youtube, LLC*, United States District Court for the District of Delaware, C.A. No. 13-990 (GMS) / *Videoshare, LLC* v. *Vimeo, LLC.*, United States District Court for the District of Delaware, C.A. No. 13-992 (GMS), dated Sep. 18, 2015, 16 pages (Document 62).

Defendants' Motion for Clarification and/or Reconsideration of Claim Construction Order, *VideoShare, LLC* v. *Google Inc.* and *Youtube, LLC*, United States District Court for the District of Delaware, C.A. No. 13-cv-990-GMS / *VideoShare, LLC* v. *Vimeo, LLC.*, United States District Court for the District of Delaware, C.A. No. 13-cv-992-GMS, dated Jan. 20, 2016, 7 pages (Document 87).

Order Construing the Terms of U.S. Pat. No. 8,438,608 and U.S. Pat. No. 8,646,302, *VideoShare, LLC* v. *Google Inc.* and *Youtube, LLC*, United States District Court for the District of Delaware, C.A. No. 13-cv-990-GMS / *VideoShare, LLC* v. *Vimeo, LLC.*, United States District Court for the District of Delaware, C.A. No. 13-cv-992-GMS, dated Jan. 6, 2016, 6 pages (Document 92).

Videoshare's Response to Defendants' Motion for Reconsideration, *VideoShare, LLC* v. *Google Inc.* and *Youtube, LLC*, United States District Court for the District of Delaware, C.A. No. 13-cv-990-GMS / *Videoshare, LLC* v. *Vimeo, LLC.*, United States District Court for the District of Delaware, C.A. No. 13-cv-992-GMS, dated Feb. 8, 2016, 13 pages (Document 119).

Order, *VideoShare, LLC* v. *Google Inc.* and *Youtube, LLC*, United States District Court for the District of Delaware, C.A. No. 13-cv-990-GMS / *VideoShare, LLC* v. *Vimeo, LLC.*, United States District Court for the District of Delaware, C.A. No. 13-cv-992-GMS, dated Mar. 2, 2016, 2 pages (Document 131).

http://www.youtube.com.

http://www.vimeo.com.

http://www.viddler.com.

Liwerant, Gad, et al., U.S. Appl. No. 15/971,881 entitled "Sharing a Streaming Video," filed in the U.S. Patent and Trademark Office May 4, 2018.

U.S. Appl. No. 09/497,587, filed Feb. 3, 2000.

U.S. Appl. No. 09/631,583, filed Aug. 3, 2000.

XP-002181197—Press Release Jan.-Mar. 2000, Release No. 00134, Videoshare, Inc., "Introducing videoshare.com," (Mar. 8, 2000) 1 page.

XP-002149003 Getting Started with RealPublisher Version 5.1, RealNetworks, Inc., 'Online!, Feb. 12, 1998, retrieved from the internet: <URL:http://docs.real.com/docs/getstrtpub50.pdf> retrieved on Oct. 2, 2000, 57 pages.

XP-002150113 Alvear, Jose, "Guide to Streaming Multimedia," Chapter II, "Real Networks' RealAudio and Real Video," Apr. 9, 1998, pp. 183-202, Wiley Computer Publishing.

XP-002150023 Alvear, Jose, "Guide to Streaming Multimedia," Chapter 18, "Streaming E-mail", Paragraph "VideoLink Mail", Video Express Email, Apr. 9, 1998, pp. 303-317, Wiley computer Publishing.

"Simulating a Live Broadcast," RealServer Administration and Content Creation Guide, pp. 91-124.

ICQ Inc.: "Mirabilis Announces Special Version of its Popular ICQ to Support Microsoft NetMeeting 2.0", Press Release ICQ, Inc., 'online!, Apr. 28, 1997, (Apr. 28, 1997, XP002150291, Retrieved on Oct. 16, 2000 (the whole document), http://www.icq.com/press/press_release_netmeeting.html, 1 page.

XP-002149004 "RealVideo Content Creation Guide Version 1.0," Progressive Networks, Inc., copyright 1995-1997, 'Online! Jun. 12, 1997, Retrieved from the Internet: <URL:http://docs.real.com/docs/ccguide_rv10.pdf>, retrieved on Oct. 2, 2000, 124 pages.

XP-002149005 Realnetworks, Inc., Realproducer Pro User's Guide Version G2, 'Online!, Feb. 2, 1999, Retrieved from the internet: <URL:http//docs.real.com/docs/prodprouserguideg2.pdf> retrieved Oct. 2, 2000, the whole document, 67 pages.

XP002150290 ZDNET: "HoneyQ v 1.5"ZDNET Downloads Info, 'Online!, Nov. 6, 1997, retrieved from the internet: <URL: http://www.zdnet.com/downloands/stories/info/0.,000LVZ..html>, retrieved on Oct. 16, 2000, the whole document.

PCT Notification of Transmittal of the International Search Report or the Declaration, PCT/US00/21214, dated Aug. 3, 2000, dated Nov. 3, 2000, International Searching Authority, European Patent Office, 7 pages.

PCT Notification of Transmittal of the International Search Report or the Declaration, PCT/US00/21212, dated Aug. 3, 2000, dated Nov. 6, 2000, International Searching Authority, European Patent Office, 9 pages.

PCT Notification of Transmittal of the International Search Report or the Declaration, PCT/US00/21169, dated Aug. 3, 2000, dated Oct. 30, 2000, International Searching Authority, European Patent Office, 8 pages.

XP-002181198 Cullen, A., "Loudeye Announces World's First Digital Media Applications Platform," www.loudeye.com (Mar. 7, 2000), 2 pages.

XP-002181199 Cullen, A., "Encoding.com Introduces Complete Online File Conversion and Publishing Solution," www.loudeye.com (May 5, 1999), 2 pages.

Hampapur, Arun, et al., U.S. Appl. No. 60/055,751 entitled "Virage Video Engine," filed Aug. 14, 1997, 16 pages.

Keehan, Michael, et al, Certified U.S. Appl. No. 60/103,042 entitled "Asynchronous Video Forums," filed Oct. 5, 1998, 49 pages.

Moynihan, Michael, Certified U.S. Appl. No. 60/173,041 entitled "Personal Video Channel System," filed Dec. 23, 1999, 30 pages.

Amended Exhibit B7—Claim Chart, U.S. Pat. No. 8,464,302 in view of the ShareYourWorld system, Feb. 25, 2016 Deposition testimony of Chase Norlins, et al. (179 pages).

(56) References Cited

OTHER PUBLICATIONS

Exhibit A21-3—Virage Incorporated—"Protégé Software to Manage European Expansion for Virage, Inc.", etc., https://web.archive.org/web/19981212033852/http:www.virage.com/, 2 pages.
Exhibit A21-4—Virage Incorporated—"Virage and AltaVista Provide Searchable Video of the Clinton Impeachment Trial," etc., https://web.archive.org/web/1999012509550/http:/virage.com/, 2 pages.
Exhibit A21-5—Virage Incorporated—"Virage and AltaVista Provide Searchable Video of the Clinton Impeachment Trial," etc., https://web/archive.org/web/19990202122207/http:/www.virage.com/, 2 pages.
Exhibit A21-6—Virage Incorporated, "Virage and AltaVista Provide Searchable Video of the Clinton Impeachment Trial," etc., https://web.archive.org/web/19990208010749/http:/virage.com, 2 pages.
Exhibit A21-7—Virage Inc., "Virage showcases solutions at NAB99", etc., https://web.archive.org/web/19990422040754/http:/www.virage.com/, 1 page.
Exhibit A21-8—Virage Inc., "Searchable Video on the Road", etc., https://web.archive.org/web/19990429154506/http:/www.virage.com/, 1 page.
Exhibit A21-9—Virage Inc., "Virage showcases solutions at NAB99", etc., https://web.archive.org/web/19990422051117/http:/www.virage.com/av.html, 1 page.
Exhibit A21-10—Virage, Press Releases, "ABCNews.com, CNET and C-SPAN Turn to Virage to Bring Prime-time Broadcast Content to the Web," Amsterdam, Holland, Sep. 10, 1999, https://web.archive.org/web/19991128125435/http:/www.virage.com/news/sept_1999_vi_live.html, 3 pages.
Exhibit A21-11—Virage Inc., "Searchable Video on the Road", etc., https://web.archive.org/web/19990508213857/http:/www.virage.com/index.html, 1 page.
Exhibit A21-12—Virage, Press Releases, "Bell Atlantic Selects Virage to Supply Searchable Video and Audio Search Engines for Innovative Media Archiving Services," San Mateo, CA, https://web.archive.org/web/19990915182119/http:/www.virage.com/news/may_1999_bellatlantic.html, 2 pages.
Exhibit A21-13—Virage Showcase, "Showcase, See Searchable Video in Action!", http://web.archive.org/web/19990915224540/http:www.virage.com/showcase, 2 pages.
Exhibit A21-14—Virage Customers and Markets: Video Production, "Video Production", https://web.archive.org/web/19991001061154/http:/www.virage.com/customers/market_video_produ . . . , 3 pages.
Exhibit A21-15—Virage Company Info, "Company Info", https://web.archive.org/web/19991127120206/http:/www.virage.com/company/index.html, 1 page.
Exhibit A21-16—Virage Customers and Markets: Market Solutions, "Market Solutions Main Header", https://web.archive.org/web/19991127202051/http:/www.virage.com/customers/market_solutions.html, 2 pages.
Exhibit A21-17—Virage Customers and Markets: Harvard Business School Success Story, "Success Stories, Virage and Harvard Business School", https://web.archive.org/web/20000124075905/http:/www.virage.com/customers/success_hbs.html, 2 pages.
Exhibit A21-18—Virage Products and Services, "Products and Services Main Header", etc., https://web.archive.org/web/19991128190638/http:/www.virage.com/products/index.html, 2 pages.
Exhibit A21-19—Virage Showcase, "Showcase, See Searchable Video in Action!", https://web.archive.org/web/19991128213531/http:/www.virage.com/showcase/index.html, 3 pages.
Exhibit A21-20—Virage Products & Technologies: Video, "Video Products", https://web.archive.org/web/20000116011828/http:/www.virage.com/products/video.html, 1 page.
Exhibit A35-3—Knowledge Assembly Inc., "Knowledge Assembly, Inc. Where Minds Meet", Product Description, 1998, Internet Archive WaybackMachine Jan. 16, 1999-Jun. 4, 2002, http://web.archive.org/web/1990116222119/http:/www.knowledgeassembly.net/, 2 pages.
Exhibit A35-4—Knowledge Assembly Inc., "Knowledge Assembly, Inc. Where Minds Meet", Product Description, 1998, Internet Archive WaybackMachine Jan. 16, 1999-Jun. 4, 2002, https://web.archive.org/web/19990125100634/http:/www.knowledgeassembly.net/, 2 pages.
Exhibit A35-5—Knowledge Assembly Inc., "Knowledge Assembly, Inc. Where Minds Meet", Product Description, etc., 1998, Internet Archive WaybackMachine Jan. 16, 1999-Jun. 4, 2002, https://web.archive.org.web/19990424122420/http:/www.knowledgeassembly.net/, 2 pages.
Exhibit A35-6—Demonstration 56.6k, Knowledge Assembly Inc. Demonstration Channel—56.6k, 1998, Internet Archive WaybackMachine Apr. 24, 1999-Jun. 17, 2000, https://web.archive.org/web/19990424140545/http:/www.knowledgeassembly.net/De . . . , 2 pages.
Exhibit A35-7—Demonstration, Knowledge Assembly Demonstrations, Internet Archive WaybackMachine Apr. 24, 1999-Jun. 17, 2000, https://web.archive.org/web/19991002004139/http:/www.knowledgeassembly.net/De . . . , 1 page.
Exhibit A35-8—Knowledge Providers, Knowledge Assembly Inc. Demonstration Channel, "Knowledge Providers", 1998, Internet Archive WaybackMachine Oct. 1, 1999-Mar. 8, 2000, https://web.archive.org/web/19991001235109/http:/www.knowledgeassembly.net/De . . . , 2 pages.
Exhibit A35-9—Demo 28.8k, Knowledge Assembly, Demonstration—28k, Internet Archive WaybackMachine Oct. 2, 1999-Jun. 17, 2000, https://web.archive.org/web/19991002200939/http:/www.knowledgeassembly.net/dem . . . , 1 page.
Exhibit A35-10—Demo 56.6k, Knowledge Assembly, Demonstration—56K, Internet Archive WaybackMachine Aug. 23, 1999-Jun. 17, 2000, https://web.archive.org/web/19990823043127/http://www.knowledgeassembly.net/De . . . , 1 page.
Exhibit A35-11—Description, Knowledge Assembly, "Description", Internet Archive WaybackMachine Oct. 29, 1999-Jun. 24, 2002, https://web.archive.org/web/19991002021509/http:/www.knowledgeassembly.net/Des . . . , 2 pages.
Exhibit A35-12—Press Release, Knowledge Assembly, "Press Release, Multimedia Experts Using New Video Technology Over the Internet," Prescott, Arizona Feb. 18, 1999, https://web.archive.org/web/19991002043510/http:/www.knowledgeassembly.net/Pres, , 2 pages.
Exhibit A35-13—Product Description, Knowledge Assembly Inc. "Product Description", 1998, Internet Archive WaybackMachine Apr. 24, 1999-Nov. 4, 1999, https://web.archive.org/web/19990424144720/http:/www.knowledgeassembly.net/Pro . . . , 2 pages.
Exhibit A35-14—Technology Description, Knowledge Assembly, "Technology Description Video Forum", Last Modified May 4, 1999, Internet Archive WaybackMachine Mar. 1, 2000-Dec. 18, 2001, https://web.archive.org/web/20000301153413/http:/www.knowledgeassembly.net/scri . . . , 1 page.
Exhibit A35-15—MultiMediaCom | Knowledge Assembly Inc., "Knowledge Assembly Inc MultiMediaCom video forum", Internet Archive WaybackMachine Sep. 30, 1999-Jun. 18, 2000, https://web.archive.org/web/19990930030827/http:/www.knowledgeassembly.net/scri . . . , 2 pages.
Exhibit A35-16—Viewing Directions, Knowledge Assembly "Viewing Directions", Internet Archive WaybackMachine Oct. 2, 1999-Nov. 5, 1999, https://web.archive.org/web/19991002124956/http:/www.knowledgeassembly.net/Sup . . . , 1 page.
Exhibit A35-17—Email communication from Marcia H. Grabow to Michael Keehan, "process feedback", Dec. 30, 1998, one page.
Exhibit A35-18—Email communication from Ben O. Fordham to Michael Keehan, "Re: Oh Boy!", Feb. 24, 1999, two pages.
Exhibit A35-19—Email communication from M Cooperman to Michael Keehan, et al., "System feedback on Womanet", Feb. 16, 2000, one page.
Exhibit C3—Claim Chart, U.S. Pat. No. 8,438,608 in view of References cited in Exhibits A1-A27 of Defendants' Initial Invalidity Contentions and Exhibits A28-A35 of the Supplemental Invalidity Contentions in combination with U.S. Pat. No. 6,188,398; U.S. Pat. No. 6,188,428; U.S. Pat. No. 6,285,984; U.S. Pat. No. 6,314,466 B1; U.S. Pat. No. 6,487,663 B1; U.S. Pat. No. 6,489,980; U.S. Pat. No. 6,973,436; WO 00/20960 and references listed in Exhibit C1 (32 pages).

(56) References Cited

OTHER PUBLICATIONS

Amended Exhibit C3—Claim Chart, U.S. Pat. No. 8,438,608 in view of References cited in Exhibits A1-A27 of Defendants' Initial Invalidity Contentions and Exhibits A28-A36 of the Supplemental Invalidity Contentions in combination with U.S. Pat. No. 6,188,398; U.S. Pat. No. 6,188,428; U.S. Pat. No. 6,285,984; U.S. Pat. No. 6,314,466 B1; U.S. Pat. No. 6,487,663 B1; U.S. Pat. No. 6,489,980; U.S. Pat. No. 6,973,436; U.S. Pat. No. 8,392,532; U.S. Pat. No. 6,026,371; U.S. Pat. No. 6,374,260; U.S. Pat. No. 6,044,376; U.S. Pat. No. 7,155,663; U.S. Pat. No. 6,505,160; U.S. Pat. No. 6,842,190; U.S. Pat. No. 7,039,599; U.S. Pat. No. 5,608,874; U.S. Pat. No. 8,275,661; U.S. Pat. No. 6,963,906; U.S. Pat. No. 7,146,408; U.S. Pat. No. 7,093,191; et al. (59 pages).
Second Amended Exhibit C3—Claim Chart, U.S. Pat. No. 8,438,608 in view of References cited in Exhibits A1-A27 of Defendants' Initial Invalidity Contentions and Exhibits A28-A36 of the Supplemental Invalidity Contentions in combination with U.S. Pat. No. 6,188,398; U.S. Pat. No. 6,188,428; U.S. Pat. No. 6,285,984; U.S. Pat. No. 6,314,466 B1; U.S. Pat. No. 6,487,663 B1; U.S. Pat. No. 6,489,980; U.S. Pat. No. 6,973,436; U.S. Pat. No. 8,392,532; U.S. Pat. No. 6,026,371; U.S. Pat. No. 6,374,260; U.S. Pat. No. 6,044,376; U.S. Pat. No. 7,155,663; U.S. Pat. No. 6,505,160; U.S. Pat. No. 6,842,190; U.S. Pat. No. 7,039,599; U.S. Pat. No. 5,608,874; U.S. Pat. No. 8,275,661; U.S. Pat. No. 6,963,906; U.S. Pat. No. 7,146,408; U.S. Pat. No. 7,093,191; et al. (63 pages).
Exhibit C4—Claim Chart, U.S. Pat. No. 8,464,302 in view of References cited in Exhibits B1-B28 of Defendants' Initial Invalidity Contentions and Exhibits B29-B36 of the Supplemental Invalidity Contentions in combination with U.S. Pat. No. 6,188,398; U.S. Pat. No. 6,188,428; U.S. Pat. No. 6,285,984; U.S. Pat. No. 6,314,466 B1; U.S. Pat. No. 6,487,663 B1; U.S. Pat. No. 6,489,980; U.S. Pat. No. 6,973,436; WO 00/20960; references listed in Exhibit C2; (36 pages).
Amended Exhibit C4—Claim Chart, U.S. Pat. No. 8,464,302 in view of References cited in Exhibits B1-B28 of Defendants' Initial Invalidity Contentions and Exhibits B29-B36 of the Supplemental Invalidity Contentions in combination with U.S. Pat. No. 6,188,398; U.S. Pat. No. 6,188,428; U.S. Pat. No. 6,285,984; U.S. Pat. No. 6,314,466 B1; U.S. Pat. No. 6,487,663 B1; U.S. Pat. No. 6,489,980; U.S. Pat. No. 6,973,436; U.S. Pat. No. 8,392,532; U.S. Pat. No. 6,026,371; U.S. Pat. No. 6,374,260; U.S. Pat. No. 6,044,376; U.S. Pat. No. 7,155,663; U.S. Pat. No. 6,505,160; U.S. Pat. No. 6,842,190; U.S. Pat. No. 7,039,599; U.S. Pat. No. 5,608,874; U.S. Pat. No. 8,275,661; U.S. Pat. No. 6,963,906; U.S. Pat. No. 7,146,408; U.S. Pat. No. 7,093,191; U.S. Pat. No. 6,877,134; et al. (78 pages).
Exhibit C5—Claim Chart, U.S. Pat. No. 8,438,608 in view of Koz U.S. Pat. No. 6,188,428, Keehan WO00/20960, Jain U.S. Pat. No. 7,093,191 (157 pages).
Exhibit C6—Claim Chart, U.S. Pat. No. 8,438,608 in view of Koz U.S. Pat. No. 6,188,428, Scott et al. U.S. Pat. No. 6,489,980, Jain U.S. Pat. No. 7,093,191 (101 pages).
Exhibit C7—Claim Chart, U.S. Pat. No. 8,464,302 in view of Koz U.S. Pat. No. 6,188,428, Keehan WO00/20960, Jain U.S. Patent Application Publication No. 2001/0018693 A1 and Collins-Rector U.S. Pat. No. 6,188,398 (202 pages).
Exhibit C8— Claim Chart, U.S. Pat. No. 8,464,302 in view of Koz U.S. Pat. No. 6,188,428, Scott et al. U.S. Pat. No. 6,489,980, Jain U.S. Pat. No. 7,093,191 and Collins-Rector U.S. Pat. No. 6,188,398 (154 pages).
Alvear, Jose, "Virage Adds Face Recognition Capabilities to VideoLogger Software," Feb. 9, 2000, Streamingmedia.com, 3 pages (retrieved from the internet Jul. 16, 2018, http://www.thefreelibrary.com/_/print/PrintArticle.aspx?id=58057107).
Bach, Jeffrey R., et al., "Virage image search engine: an open framework for image management," Proceedings of SPIE, Electronic Imaging: Science and Technology, Mar. 13, 1996, vol. 2670, 13 pages, SPIEDigitalLibrary.org/conference-proceedings-of-spie.
Telestream Application Note, FlipFactory™ Notify Plug-in for Virage VideoLogger®, Mar. 20, 2001, Telestream, Inc., Nevada City, CA, USA, 2 pages.
Gupta, Amarnath, "Visual Information Retrieval Technology a Virage Perspective," Revision 4, Feb. 11, 1997, 10 pages, Virage, Inc., San Mateo, CA.
Hampapur, Arun, et al., "Virage Video Engine," Proceedings of SPIE, Electronic Imaging '97, Jan. 15, 1997,vol. 3022, 12 pages, SPIEDigitalLibrary.org/conference-proceedings-of-spie.
Virage Introduces Free MyLogger Video Publishing Application at Streaming Media West '99 Conference, Business Wire, Dec. 7, 1999 , 3 pages (retrieved from the Internet Jul. 16, 2018, https://www.thefreelibrary.com/_/print/PrintArticle.aspx?id=58057107).
Leland, Jon, "Online Video Service Shortcuts," Videography, published Mar. 1999, 24, 3 (ABI/INFORM® Professional Advanced), pp. 150-153, 10 pages (including cover, table of contents).
Microsoft Releases DirectShow SDK—Universal Playback for DVD, Digital Video and Audio, and the Internet, Posted Dec. 10, 1997, 10 pages, http://news.microsoft.com/1997/12/10/microsoft-releases-directshow-sdk-universal-playback-for-dvd-digital-video-and-audio-and-the-internet/#sm.0001xo9pbo . . . .
Rupley, Sebastian, "Hollywood Goes to the Web," PC Magazine, Trends, Digital Video, published Jun. 22, 1999, 1 page.
RealServerAdministration Guide, RealServer 7.0 Powered by RealSystem G2, 1998-1999, 462 pages, RealNetworks, Inc., Seattle, WA.
Office actions and responses for U.S. Appl. No. 09/803,243, dated Mar. 9, 2001 to Jan. 5, 2009 (185 pages).
Office actions and responses for U.S. Appl. No. 11/097,441, dated Jan. 11, 2005 to Sep. 27, 2010 (104 pages).
Resende, Patricia, "Citizens Bank Names Stieff, Conn Vice Presidents", *Boston Sunday Herald*, Feb. 27, 2000.
E-Commerce Productivity Tools.
Videoshare, Inc., "How can you share video today? The Difficult and Painful Way!", *VideoShare* presentation, 1999, 6 pages.
Townley, John, "VideoShare.com Adds Video to All web-Based Communications," internetnews.com, Mar. 8, 2000.
For Immediate Release, Release number: 00133, "VideoShare Launches New Website," Jan. 10, 2000.
VideoShare Producer v. 1.0 process Overview, 10 pages.
About.com, *Blue Mountain.com and VideoShare Deliver Video Greetings for Personalized Mother's Day Wishes*, "Children and Loved Ones Can Send Life-Like Messages to Mom Using VideoShare's Streaming Video Technology," May 2001, 2 pages, FitzGerald Communications Inc.
Heim, Sarah J, "Excite@Home Launches Video App," Adweek, Oct. 9, 2000, 1 page, Schwartz Communications, Inc.
Milstein, Sarah, "Must-See TV iClips' streaming video strategy could succeed where others have failed," *AlleyCat News*, Nov. 2000, pp. 44-48, Schwartz Communications, Inc.
Sweeney, Dan, "applications Monetizing Eyeballs Will video streams ever mean revenue streams?", *America's Network*, May 1, 2001, 3 pages, FitzGerald Communications Inc.
"Streaming video for the masses Start-up ASP VideoShare focuses on the end user," *America's Network*, Jun. 1, 2001, 1 page, FitzGerald Communications Inc.
Greenberg, Daniel, "E-cards speed up season's greetings," *Austin American-Statesman*, Dec. 15, 2000, 2 pages, Schwartz Communications, Inc.
Deposition of Chase Norlin, Phoenix, Arizona, Feb. 25, 2016, VideoShare, LLC -against- Google Inc. and Youtube, LLC, United States District Court for the District of Delaware, C.A. No. 13-cv-990-GMS / VideoShare, LLC -against- Vimeo, LLC., United States District Court for the District of Delaware, C.A. No. 13-cv-992-GMS (130 pages).
Volume: 1, pp. 1 to 243, Exhibits: 1 to 13, Videotaped Deposition of Christopher Dodge, Boston, Massachusetts, Feb. 12, 2016, *VideoShare, LLC* vs. *Google Inc.* and *Youtube, LLC,* United States District Court for the District of Delaware, C.A. No. 13-cv-990-GMS / *VideoShare, LLC* vs. *Vimeo, LLC.,* United States District Court for the District of Delaware, C.A. No. 13-cv-992-GMS (119 pages).
Amended Exhibit A8—Claim Chart, U.S. Pat. No. 8,438,608 in view of the ShareYourWorld system, 95 pages.
Second Amended Exhibit A8—Claim Chart, U.S. Pat. No. 8,438,608 in view of the ShareYourWorld system, 148 pages.

(56) References Cited

OTHER PUBLICATIONS

Amended Exhibit A21—Claim Chart, U.S. Pat. No. 8,438,608 in view of Jain U.S. Pat. No. 7,093,191, Virage Video Logger and Video Search Tools, 150 pages.
Amended Exhibit A23—Claim Chart, U.S. Pat. No. 8,438,608 in view of Wood U.S. Pat. No. 8,392,532 (96 pages).
Amended Exhibit A26—Claim Chart, U.S. Pat. No. 8,438,608 in view of Moynihan U.S. Patent Application Publication No. 2002/0056119 A1, the AlwaysOnTV.com system (118 pages).
Exhibit A28—Claim Chart, U.S. Pat. No. 8,438,608 in view of Collins-Rector et al. U.S. Pat. No. 6,188,398 (46 pages).
Exhibit A29—Claim Chart, U.S. Pat. No. 8,438,608 in view of Koz et al., U.S. Pat. No. 6,188,428 (65 pages).
Exhibit A30—Claim Chart, U.S. Pat. No. 8,438,608 in view of Speicher, U.S. Pat. No. 6,285,984 (64 pages).
Amended Exhibit A30—Claim Chart, U.S. Pat. No. 8,438,608 in view of Speicher, U.S. Pat. No. 6,285,984 (71 pages).
Exhibit A31—Claim Chart, U.S. Pat. No. 8,438,608 in view of Agarwal et al., U.S. Pat. No. 6,314,466 B1 (33 pages).
Exhibit A32—Claim Chart, U.S. Pat. No. 8,438,608 in view of Scott et al., U.S. Pat. No. 6,489,980 (59 pages).
Exhibit A33—Claim Chart, U.S. Pat. No. 8,438,608 in view of Shkedi et al., U.S. Pat. No. 6,973,436 (21 pages).
Exhibit A34—Claim Chart, U.S. Pat. No. 8,438,608 in view of Jaisimha et al., U.S. Pat. No. 6,487,663 B1 (48 pages).
Exhibit A35—Claim Chart, U.S. Pat. No. 8,438,608 in view of Keehan WO00/20960 (89 pages).
Amended Exhibit A35—Claim Chart, U.S. Pat. No. 8,438,608 in view of the Asynchronous Video Forums Patent Applications (155 pages).
Exhibit A36—Claim Chart, U.S. Pat. No. 8,438,608 in view of Mohan, "Multimedia content customization for universal access", ("Mohan I"), 81 pages.
Exhibit A37—Claim Chart, U.S. Pat. No. 8,438,608 in view of Mutual WO0180039 (64 pages).
Amended Exhibit A37—Claim Chart, U.S. Pat. No. 8,438,608 n view of Mutual WO0180039 (65 pages).
Exhibit B17—Claim Chart, U.S. Pat. No. 8,464,302 in view of Wood U.S. Pat. No. 6,895,557 (45 pages).
Exhibit B18—Claim Chart, U.S. Pat. No. 8,464,302 in view of Armstrong U.S. Pat. No. 7,017,173 (54 pages).
Exhibit B19—Claim Chart, U.S. Pat. No. 8,464,302 in view of Brooks U.S. Pat. No. 7,339,993 (67 pages).
Exhibit B20—Claim Chart, U.S. Pat. No. 8,464,302 in view of Wood U.S. Pat. No. 8,392,532 (38 pages).
Amended Exhibit B20—Claim Chart, U.S. Pat. No. 8,464,302 in view of Wood U.S. Pat. No. 8,392,532 (59 pages).
Exhibit B21—Claim Chart, U.S. Pat. No. 8,464,302 in view of Lee U.S. Patent Application Publication No. 2002/0049852 (71 pages).
Exhibit B22—Claim Chart, U.S. Pat. No. 8,464,302 in view of David U.S. Patent Application Publication No. 2003/0001846 (64 pages).
Exhibit B23—Claim Chart, U.S. Pat. No. 8,464,302 in view of Moynihan U.S. Patent Application Publication No. 2002/0056119 (55 pages).
Exhibit B24—Claim Chart, U.S. Pat. No. 8,464,302 in view Moynihan U.S. Patent Application Publication No. 2002/0056119 and Armstrong U.S. Pat. No. 7,017,173 (62 pages).
Exhibit B25—Claim Chart, U.S. Pat. No. 8,464,302 in view of Kenner U.S. Pat. No. 6,269,394 (48 pages).
Exhibit B26—Claim Chart, U.S. Pat. No. 8,464,302 in view of Jain U.S. Pat. No. 7,093,191 (29 pages).
Exhibit B27—Claim Chart, U.S. Pat. No. 8,464,302 in view of Madrane RE42728 (212 pages).
Exhibit B28—Claim Chart, U.S. Pat. No. 8,464,302 in view of England, *RAVE: Real-time services for the web* (44 pages).
Exhibit B29—Claim Chart, U.S. Pat. No. 8,464,302 in view of Collins-Rector et al. U.S. Pat. No. 6,188,398 (53 pages).
Exhibit B30—Claim Chart, U.S. Pat. No. 8,464,302 in view of Koz et al. U.S. Pat. No. 6,188,428 (59 pages).
Exhibit B31—Claim Chart, U.S. Pat. No. 8,464,302 in view of Speicher U.S. Pat. No. 6,285,984 (67 pages).
Amended Exhibit B31—Claim Chart, U.S. Pat. No. 8,464,302 in view of Speicher U.S. Pat. No. 6,285,984 (82 pages).
Exhibit B32—Claim Chart, U.S. Pat. No. 8,464,302 in view of Agarwal et al. U.S. Pat. No. 6,314,446 (25 pages).
Exhibit B33—Claim Chart, U.S. Pat. No. 8,464,302 in view of Scott et al. U.S. Pat. No. 6,489,980 (41 pages).
Exhibit B34—Claim Chart, U.S. Pat. No. 8,464,302 in view of Shkedi U.S. Pat. No. 6,973,436 (35 pages).
Exhibit B35—Claim Chart, U.S. Pat. No. 8,464,302 in view of Jaisimha et al. U.S. Pat. No. 6,487,663 (46 pages).
Exhibit B36—Claim Chart, U.S. Pat. No. 8,464,302 in view of Keehan WO00/20960 (80 pages).
Exhibit B37—Claim Chart, U.S. Pat. No. 8,464,302 in view of Rangan U.S. Pat. No. 6,154,771 (66 pages).
Amended Exhibit B37—Claim Chart, U.S. Pat. No. 8,464,302 in view of Rangan U.S. Pat. No. 6,154,771 (66 pages).
Exhibit B38—Claim Chart, U.S. Pat. No. 8,464,302 in view of MutualWO 01/80039 (62 pages).
Amended Exhibit B38—Claim Chart, U.S. Pat. No. 8,464,302 in view of MutualWO 01/80039 (63 pages).
Exhibit B39—Claim Chart, U.S. Pat. No. 8,464,302 in view of Cook U.S. Pat. No. 6,338,044 (49 pages).
A Dose of Reality, Seattle 24X7 (http://www.seattle24x7.com/community/shoptalk/2010/08/03/a-dose-of-reality/) ("Reality").
How ShareYourWorld works, no date, 3 pages, info@shareyourworld.com.
ShareYourWorld-Advisory Board, Management Team, About, Apr. 19, 2000; Feb. 9, 2000; 8 pages www.shareyourworld.com/about/advisory.phtml; www.shareyourworld.com/about/management.phtml; 222.shareyourworld.com/about.phtml; www.shareyourworld.com.
ShareYourWorld Business Plan, *Creating a Next Generation Digital Talent Agency by Leveraging the Market for Digital Media Assets*, Nov. 22, 1999, 38 pages.
An Introduction to Share Your World, 16 pages, shareyourworld.com.
Zelman Moses Business Plan, *Creating a Next Generation Digital Talent Agency by Leveraging the Market for Digital Media Assets*, Mar. 29, 1999, 30 pages.
AlwaysonTV.com, About Us, May 11, 2000, https://web.archive.org/web/20000511161839/http:/www.alwaysontv.com/about_us.htm.
Knowledge Assembly, Inc. Demonstration Channel Screenshot, 1998, 2 pages, https://www.web.archive.org/web/19990424140545/http:/www.knowledgeassembly.net/De . . . .
Mohan, R., et al., "Multimedia content customization for universal access, Nov. 1998, pp. 410-418, SPIE Conference on Multimedia Storage and Archiving Systems III" (SPIE vol. 3527), 0277-768X98.
Mohan, R., et al., "Adapting Multimedia Internet Content for Universal Access", IEEE Transaction on Multimedia, Mar. 1999, pp. 104-114, vol. 1, No. 1, IEEE.
http://www.virage.com.
Office Action issued by the U.S. Patent and Trademark Office in the U.S. Appl. No. 15/971,881, dated Dec. 4, 2018, U.S. Patent and Trademark Office, Alexandria, VA. (13 pages).

* cited by examiner

SYSTEMS AND METHODS FOR SHARING VIDEO WITH ADVERTISEMENTS OVER A NETWORK

RELATED APPLICATIONS

This application is a continuation application claiming the benefit of and priority to co-pending U.S. patent application Ser. No. 13/909,876, filed on Jun. 4, 2013, which is a continuation of U.S. patent application Ser. No. 09/631,583, filed Aug. 3, 2000, now U.S. Pat. No. 8,464,302, which is a continuation-in-part of abandoned U.S. patent application Ser. No. 09/497,587, filed Feb. 3, 2000, which is based on and claims priority to U.S. Provisional Patent Application No. 60/147,029, filed Aug. 3, 1999. The entireties of these applications are incorporated by reference herein.

FIELD OF THE INVENTION

This invention relates generally to the distribution of video segments. More particularly, the invention relates to sharing in streaming video format over a network a video to which an advertisement selected by the sender of the video has been attached.

BACKGROUND

A video can be sent over a computer network as a file attachment to an electronic mail (e-mail) message. With this type of transmission, the entire video file must be transmitted and received before the receiver can view the video. For large files, the time required to complete such transmissions can be longer than the actual playing time of the video. Also, this type of transmission typically requires multiple computer programs to perform all of the necessary functions, including an e-mail application program to send or receive the video in computer file form, and a second program to play or display the video from the received file attachment. With this type of transmission, it is difficult to control the delivery time of the video, and it is difficult to share or forward the received video.

A video can be posted to a World Wide Web ("Web") page. In order to provide a video in this manner, a server computer connected to the Web must be used to host the Web site, and software packages must exist and be used to prepare the video, and transmit it over the Web using the File Transfer Protocol (FTP or ftp) or the HyperText Transfer Protocol (HTTP or http). To implement this type of video posting, at least a detailed knowledge of various computer communication protocols is required.

SUMMARY OF THE INVENTION

It is an object of this invention to provide methods and systems for sharing video segments over a network, to which video segments a sender of a video segment can attach an advertisement of the sender's choosing. The video segment and associated advertisement can then be streamed over the network, for example the Internet, to a receiving computer such that a person at the receiving computer can view the video segment and the associated advertisement.

In accordance with the present invention, full motion video can be automatically uploaded to a video server and can then be associated with an advertisement selected by the sender of the video. The video and associated advertisement can be accessed by any number of viewers after each viewer has been provided with an identifier of the video. The video identifier can in general be an identification tag which identifies where and/or how the video can be accessed, for example a network address, or a universal resource locator ("URL"). The video can also be identified with an image that represents the content or subject matter of the video, so that the video can readily be identified when held in a collection of videos. Such identifiers as file names that are useful in a computer file processing, storage and retrieval system can further identify the video.

In one aspect, the invention features a method of sending a video segment and an associated advertisement over a computer network. The method includes (a) acquiring a video segment at a computer system, (b) acquiring one or more advertisements at the computer system, (c) offering to a sender an opportunity to indicate a selection of an advertisement of the one or more advertisements to be associated with the video segment, and (d) accepting from the sender the indication of a selection of the advertisement to be associated with the video segment, the video segment and the advertisement to be sent over the computer network. The method further includes, in response to the indication accepted in step (d), automatically at the computer system assuring that the video segment is in a streaming video format, creating an identifier for the video segment, associating the video segment and the advertisement, and sending the video segment, the identifier, and the associated advertisement over the computer network to a receiving computer system.

In one embodiment, the step of offering to a sender an opportunity to indicate a selection of an advertisement of the one or more advertisements includes a criterion selectable by the sender. The criterion can be one of a subject of the advertisement, a length of the advertisement, and a remuneration paid for selecting the advertisement. The criterion can include affirmatively leaving the selection to the determination of the server computer system.

In one embodiment, the step of offering to a sender an opportunity to indicate a selection of an advertisement of the one or more advertisements can include a default selection to be made if the sender fails to indicate a selection. The default selection can include a substantially randomized selection of an advertisement.

In another aspect, the invention relates to a method of sending a video segment and an associated advertisement over a computer network. The method includes (a) uploading a video segment from a sender computer system to a server computer system, (b) selecting, using the sender computer system, an advertisement stored at the server computer system, and (c) transmitting from the sender computer an indication of an intent to send the video segment and the advertisement over the computer network, the indication causing the server computer system automatically to assure that the video segment is in a streaming video format, to create an identifier for the video segment, to associate the video segment and the advertisement, and to send the video segment, the identifier, and the associated advertisement over the computer network to a receiving computer system.

In one embodiment, selecting an advertisement can include an advertisement using a criterion chosen by an operator of the sender computer system. The criterion can be one of a subject of the advertisement, a length of the advertisement, and a remuneration paid for selecting the advertisement. The criterion can include leaving the selection to the determination of the server computer system. The selection can include a substantially randomized selection of an advertisement. The selection can be based on a price paid by an advertiser.

In one aspect the invention involves a system for sending a video and an associated advertisement over a computer network. The system includes a first computer system for connection to other computer systems over a computer network. The first computer system includes a first module operating on the first computer system for acquiring a video segment, a second module operating on the first computer system for generating an identifier associated with the video segment, a third module operating on the first computer system for accepting an indication of intent to send the video segment to another computer, a fourth module operating on the first computer system for automatically sending the video segment and the identifier over the computer network to a receiving computer, and a fifth module operating on the first computer system for accepting from a sender an indication of an advertisement to be associated with the video segment and for transmitting the indication to another computer. The system also includes a second computer system comprising storage and for connection to other computer systems over the computer network. The second computer system includes a sixth module operating on the second computer system for automatically receiving the video segment and its associated identifier sent by the first computer system over the computer network, a seventh module operating on the second computer system for storing an advertisement, an eighth module operating on the second computer system for associating the advertisement with the video segment, a ninth module operating on the second computer system for storing the video segment and associated identifier in the storage, a tenth module operating on the second computer system for receiving an indication to associate the stored video segment and the advertisement, an eleventh module operating on the second computer system for automatically assuring that the video segment is in a streaming video format, and a twelfth module operating on the second computer system for sending the video segment, the identifier, and the associated advertisement from the storage to a receiver computer system.

In one embodiment, the system further includes a thirteenth module operating on the second computer system for determining a price to be charged for one or more of storing the advertisement, associating the advertisement with the video segment, and sending the video segment, the identifier, and the associated advertisement from the storage to the receiver computer system. In one embodiment, the module can determine the price based on a number of transmissions of the video and the associated advertisement multiplied by a rate of charge per transmission. The rate of charge can be based on one of a type of video, a length of the video, and a quality of the video. In another embodiment, the module can determine the price based on a fixed price. Alternatively, the module can determine the price based on a percentage of a sales amount incurred in response to the advertisement.

In one embodiment, the system further includes a module operating on the second computer system for obtaining from a user of the first computer an indication of which advertisement is to be associated with the video sent by the first computer. The module for obtaining an indication of which advertisement is to be associated with the video can use a criterion for the association. The criterion can be one of a subject of the advertisement, a length of the advertisement, and a remuneration paid for selecting the advertisement. In yet another embodiment, the module for obtaining an indication of which advertisement is to be associated with the video can use a criterion for the association that includes leaving the selection to the determination of the server computer. The selection can include a substantially randomized selection of an advertisement.

In still another embodiment, the system further includes a fourteenth module operating on the second computer system for determining whether an operator of the receiver computer system is present during the presentation of the advertisement.

In a further embodiment, the system further includes a third computer system for connection to other computer systems over a computer network, the third computer system including a fifteenth module operating on the third computer system for determining whether an operator of the receiver computer system is present during the presentation of the advertisement. The fifteenth module for determining whether an operator of the receiver computer system is present during the presentation of the advertisement can include a module that causes the display of the advertisement to pause, and a module that senses if an action is performed by the viewer of the advertisement. The module that senses if an action is performed by the viewer of the advertisement can sense one of a button activation, a switch activation, an activation of a pointing device, a response to a prompt, and a physical response of the viewer. The prompt can be in the form of a question. The physical response of the viewer can be one of a voluntary action and a physiological response.

In a still further embodiment, the system further includes a module that determines what events will transpire in response to the action by the viewer. The module that determines what events will transpire in response to the action by the viewer can cause the commencement or resumption, as appropriate, of the display of one of the advertisement and the video segment; it can cause one of the advertisement and the video segment to terminate; and it can cause a predetermined response to occur if the viewer fails to take action within a predefined time interval.

In yet another embodiment, the system further includes a module that reports one of the action of the viewer and the time of the action to the second computer.

In a still further embodiment, the system further includes a sixteenth module operating on the second computer system for determining a payment to be made to one of a sender of an advertisement associated with a video segment and a viewer of the advertisement.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below. The drawings are not necessarily to scale, emphasis instead generally being placed upon illustrating the principles of the invention.

DESCRIPTION

Figure 1A:
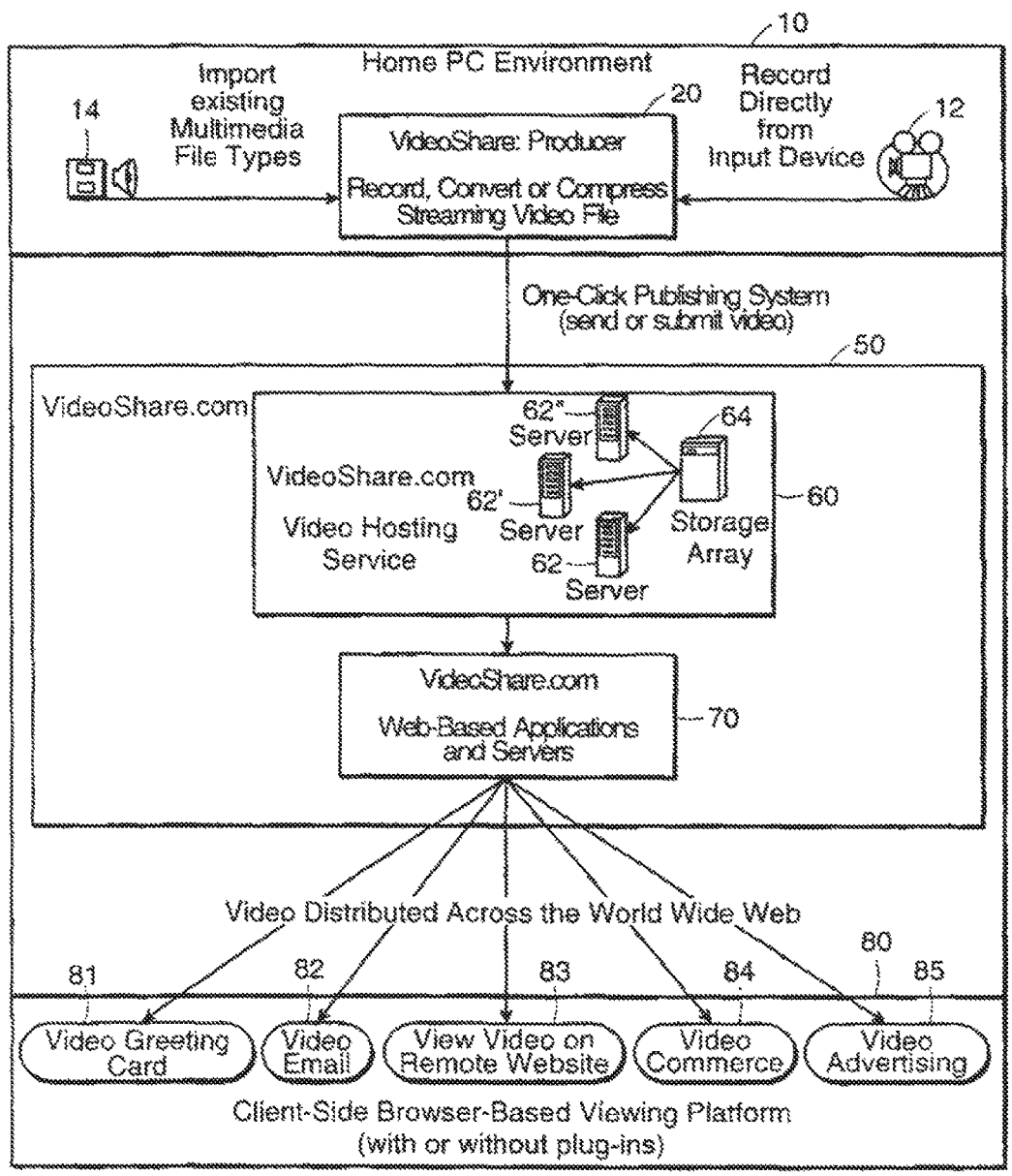
FIG. 1A is a schematic embodiment of a process and system for obtaining a video segment, uploading the video segment to a server, and sending the video segment to a recipient according to the invention.

Referring to FIG. 1, a user of the system, such as a private individual working from home, or a professional working from a business, employs a computer system 10. The computer system 10 can include a computer which can be a personal computer of conventional type such as a desktop or laptop computer, a hand held device such as a PDA, or a more powerful computer such as a workstation, a server, a minicomputer, a mainframe, or the like. The computer system 10 can operate software including a web browser such as Microsoft Internet Explorer or Netscape Navigator or Communicator or the like, for communication over a network such as the Internet via the World Wide Web (hereinafter "the Web"), or to permit wireless communication. The computer system 10 can operate software that can manipulate video segment files. The computer system 10 can communicate with video sources, such a video cameras and video recording machines, if the user wishes to employ such sources. Conventional commercially available personal computers typically have sufficient capability to meet these requirements. The computer system 10 can also employ video segments generated digitally by the computer and appropriate software, or by another computer, if the user wishes to employ such techniques. In one embodiment, the computer system 10 operates a software package called VideoShare Producer 20, which will be described and explained in more detail below.

The VideoShare Producer 20 is a software application package that the user can download from the Web site www.VideoShare.com 50 or that the user can obtain in other formats such as on a CD-ROM or bundled with other software or hardware. The VideoShare Producer 20 software can be operated by the user under his control on his computer, in the computer system 10, in order to provide the capability of recording, converting, and optionally, compressing video segments, creating one or more identifiers for a video segment, and transmitting a video segment with one or more of the identifiers to a host computer 60 operating under the control of a host such as www.VideoShare.com 50 for storage at a location under the control of the host computer 60. The host computer 60 will be described further below.

An indicator from a user of a system and or method according to the invention of an intent to send the video segment over the computer network is accepted and, in response to the indication, the video segment is automatically sent as a machine-readable file together with its associated identifier over the computer network to a receiving computer, thereby allowing the sent video segment and its associated identifier to be stored at the direction of the receiving computer and thereafter streamed out over the network.

The computer in the computer system 10 of the user one can be connected to one or more kinds of equipment for generating video segments, such as a video camera such as a Web cam 12 or another type of video camera such as a professional quality video camera. The computer in the computer system 10 of the user can be connected to one or more kinds of equipment for providing prerecorded video segments, such as a video recorder 14, or another computer that can create digital video segments through the use of suitable software, such as for example digital video segments that have been created for various commercial films, or the like. Once the user has obtained a video segment, and has manipulated it according to the procedures described below with regard to the operation of the VideoShare software package, or its equivalent, the video segment with one or more identifiers is transmitted to the host computer 60.

The host computer 60 includes one or more server computers 62, 62', 62" that communicate via a network such as the Web with other computers, such as the computer in the user's computer system 10. The one or more server computers 62, 62', 62" also communicate with a storage array 64, or optionally with a plurality of storage arrays substantially similar to storage array 64. The storage array 64 can be any convenient storage system, such as a redundant array of magnetic storage disks, one or more readable and writeable CD-ROMs, random access semiconductor memory, any combination of such storage devices, or the like. In one embodiment, the host computer 60 operates the www.VideoShare.com 50 Web site, and provides a video hosting service to one or more users. The host computer 60 can connect via the Web and the web site www.VideoShare.com 50 to one or more computers that comprise the Web, conceptually denoted by the box 70, which, while not a part of the www.VideoShare.com 50 Web site, appears to be transparent to users of the www.VideoShare.com 50 Web site, as well as to viewers of video segments that are being hosted by the host computer 60.

Viewers, or the individuals who desire, or are invited, to view video segments hosted on the host computer 60, can access video segments hosted on the host computer 60. As will be described in more detail below, in one embodiment, video segments can be hosted on host computer 60 in areas that are open to the public, or can be hosted in other areas that are open only to viewers who have the appropriate permission or authorization to view a specific video segment. A hosted video segment that is stored and controlled by the host computer 60 may be delivered to and displayed for a viewer in a variety of formats, and through a variety of methods, as denoted generally by the box 80. In different embodiments, a video segment can be displayed as: a video greeting card 81, such as a person wishing another a happy birthday; as video email 82, as video that can be viewed on a remote website 83 (e.g., a video segment embedded into the remote website so that a viewer who visits the remote website sees the video segment as part of the page that is presented); as video commerce 84, for example a video that depicts a person describing his or her experience and training as part of a resume submitted on-line; or as a video advertisement 85, for example a video depicting the benefits or showing the use of a product. Many other like applications of the technology can be envisioned. In various embodiments, the video segment can be made available to the viewer as a streaming video that is sent to the viewer, or may be made available by sending the viewer a message such as an email that contains an address of a location to visit on the Web (e.g., a Universal Resource Locator, or URL), or may be made available by sending the viewer a message that contains an embedded link to a URL, for example by sending an e-mail containing the link or by sending a still image that may have some interest to a viewer (e.g., sending a grandmother a still image of her grandchildren) to which a link is attached (e.g., the still image is linked to a streaming video of the grandchildren that is delivered and that plays when the still image is clicked). In the latter two methods of making a video segment available, or in like methods, the viewer must take some action, such as employing the URL or activating the link. In some embodiments, the viewer can use a hand held device such as a PDA or a cellular telephone that can connect to a network such as the Internet to view the video segment.

Figure 1B:
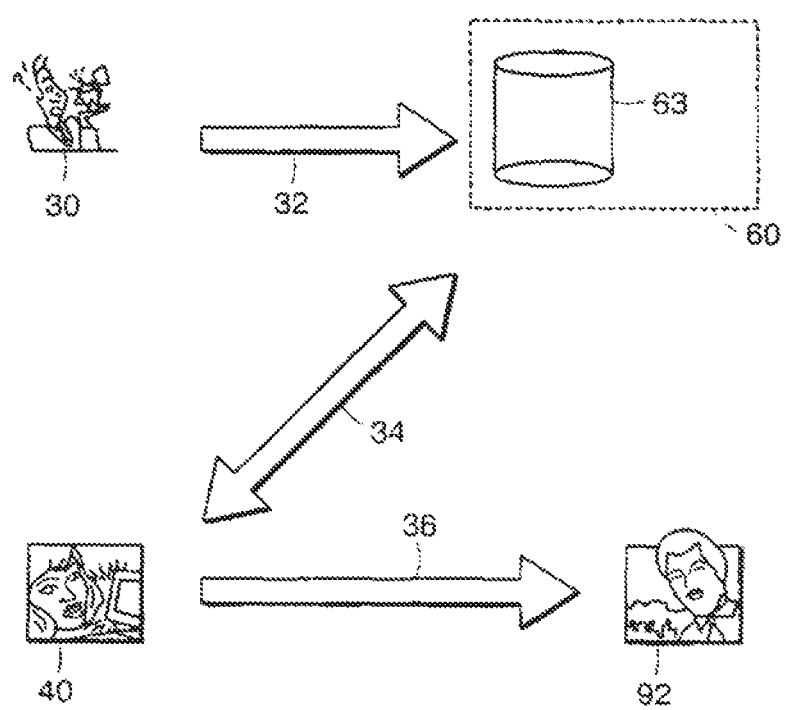
FIG. 1B is a schematic diagram of a process and system for selecting and associating an advertisement to the video which is obtained, uploaded, and sent to a recipient as in FIG. 1A, according to the invention.

FIG. 1B is a schematic diagram that shows a process and system for selecting and associating an advertisement to the video which is obtained, uploaded, and sent to a recipient as in FIG. 1A. In FIG. 1B, an exemplary advertiser 30 submits an advertisement to an advertisement database 63 which is part of the VideoShare host computer 60 of FIG. 1A, and which is accessible by the host computer 60. The advertisement can be a video clip, a still image, or an audio file, or it can be a combination of two or more of these formats. The advertisement is recorded in the advertisement database 63, which is a machine-readable medium. The submission of the advertisement by the advertiser 30 is depicted by the arrow 32. There can be a plurality of advertisers 30 and each advertiser 30 can submit one or more advertisements for posting in advertisement database 63.

According to the principles of the present invention, when exemplary user (or sender of a video) 40 uploads a video, using the user's computer 10 (which can also be referred to as sender computer 10), to the host computer 60, the host computer 60, using software that operates on the host computer 60, offers the sender 40 an opportunity to indicate a selection of an advertisement of the one or more advertisements posted to advertisement database 63 to be associated with the video segment that sender 40 has uploaded to the host computer 60. The sender 40 can be shown all or part of one or more advertisements, which can be categorized by type (e.g., areas of interest such as consumer goods, travel, entertainment, household goods, financial products, business services, hobbies, recreation, and the like), which can be categorized by duration, and which can be categorized by an amount the advertiser is willing to pay a sender and/or a viewer. The advertisements can also be categorized in many other ways. In an alternative embodiment, the sender 40 can specify types of ads that he or she wants shown. In yet another embodiment, the host computer 60 (or the entity that controls it) can select which advertisement will preferentially be offered to the sender 40 as part of the group of advertisements that are available.

Bidirectional arrow 34 denotes a process in which the host computer 60 offers the opportunity to the sender 40 to experience various advertisements, using sender computer 10 and software that is present and operating on sender computer 10, and the sender 40 can respond, using sender computer 10 and its associated software, to the host computer 60 by selecting one or more advertisements for association with the video that the sender 40 has uploaded to host computer 60. The sender 40 can transmit from the sender computer 10 an indication of an intent to send the video segment and the advertisement over the computer network to a recipient 92.

In response to receiving the indication, the host computer 60 and its associated server computer system 62, 62' automatically perform a series of actions. The actions include assuring that the video segment is in a streaming video format, creating an identifier for the video segment, associating the video segment and the advertisement, and sending the video segment, the identifier, and the associated advertisement over the computer network to a receiving computer system, such as computer 90 of FIG. 2, where the recipient 92 can view the video segment and the associated advertisement. The video segment, with or without an associated advertisement, can also be referred to as a video message. The process of sending the video message to the recipient 92 is schematically denoted by the arrow 36 from the sender 40 to the recipient 92. The entire process will be described in further detail below.

Figure 2:
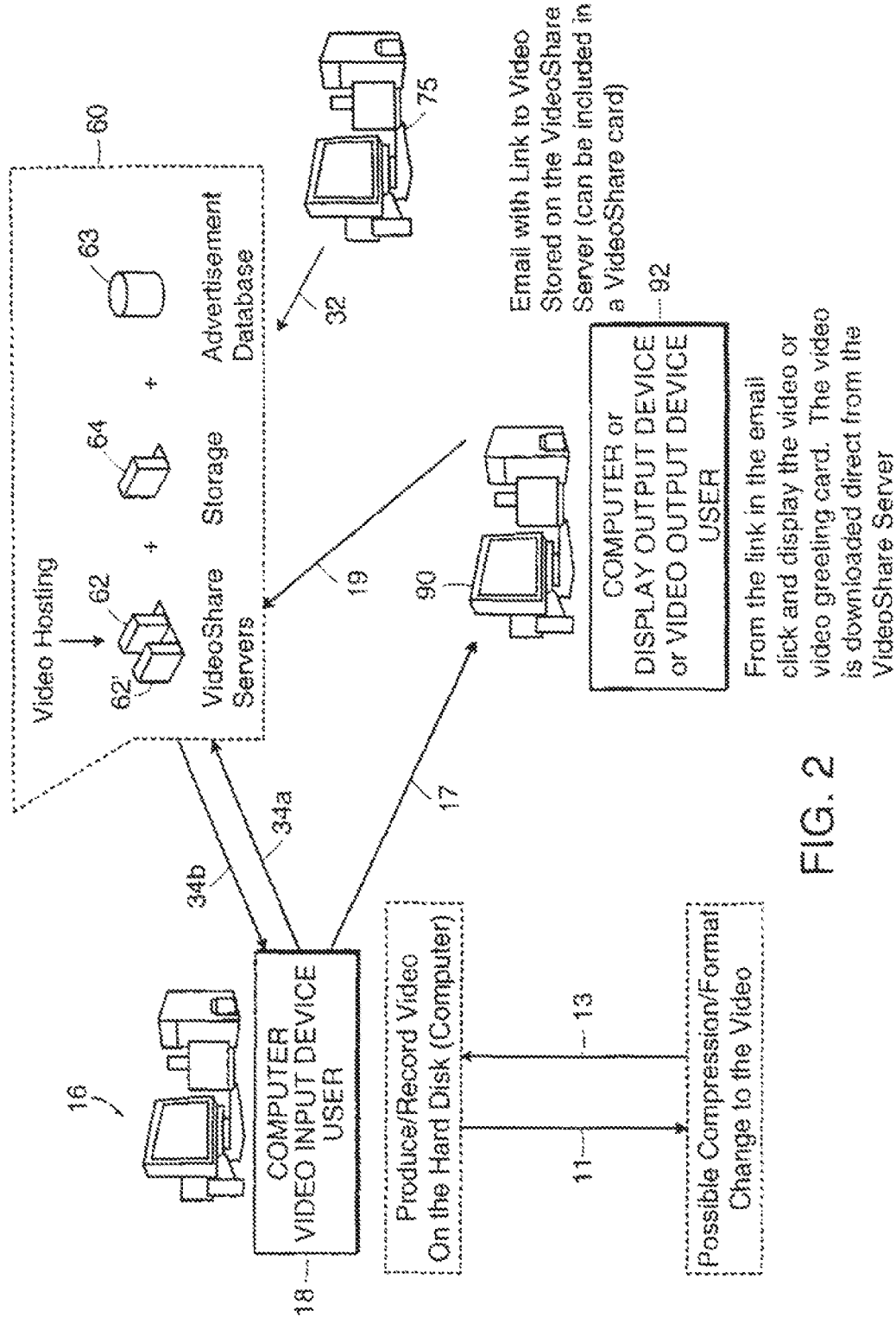
FIG. 2 is an embodiment of a system according to the invention, including the interactions and interrelationships within the system.

In FIG. 2, the exemplary advertiser 30 sends an advertisement to the host computer 60, which includes servers 62, 62', advertisement database 63, and storage 64, from a computer 75 that is connected to host computer 60 by a computer network, as depicted by arrow 32. It is also possible for an advertiser to transmit an advertisement recorded in machine-readable from or any convenient machine-readable storage medium.

A machine-readable medium can be used to record any information that can be presented in digital format, including computer code, text, images, sounds and the like. The information can include advertisements, videos, audio information or the like, or it can include computer instructions, data, or other matter useful in operating digital equipment. The information is typically recorded on the machine-readable medium as one or more symbols in a file. The machine-readable medium can be, for example, a computer floppy disk, a computer hard drive, a magnetic tape or the like, a CD-ROM, computer memory such as static or dynamic RAM, ROM, PROM, EPROM or the like, and/or any other mechanism or medium for storing machine-readable files, instructions, data or software. In a network, the machine-readable medium can be physically attached to a computer different from one on which the data may be used, or the software may operate. For example, in a network, an archival copy of software can reside on one computer and a copy can be copied to another computer, where the copy is executed or otherwise used. If transfer time is not an issue, as when a viewer of a video puts off viewing to a later time, a file containing data or information (such as a video, a text file, a database file, a spreadsheet template or the like) may reside on the same computer as the one that received the file, or on a different computer that stores the file for the convenience of the viewer. These are only some examples of commonly available machine-readable media, and it will be apparent to those of ordinary skill in the computer arts, that many other kinds of machine-readable media can be used with equal effect.

The advertisement that the advertiser 30 sends to the advertiser database 63 from the advertiser computer 75 can be created in any manner that can be used for making advertisements, for example, by having a professional advertisement agency oversee the making of one or more advertisements. The exact manner in which the advertisement is peripheral to the invention, but there are mechanisms by which one or more advertisements from one or more advertisers 30 come to be posted on the advertisement database 63. An advertiser can be charged a fee for posting and/or storing an advertisement, for associating the advertisement with the video segment, and for sending the video segment, the identifier, and the associated advertisement from the host computer 60 and its components to the receiver computer system 90 of a viewer 92.

Many different approaches to determining a price that an advertiser will be charged are possible. Advertisers can be charged a premium price to get preferential placement on an advertisement selection page of the host computer 60. Prices for such preferential placement can be determined by an auction mechanism. Alternatively, the operator of the host computer 60 can attempt to match prices advertisers 30 are willing to pay for advertising with the remuneration that senders 40 and viewers 90 are prepared to accept.

Similarly, there are many ways that senders 40 and viewers 92 of advertisements may be induced to participate. Examples of possible schemes to remunerate senders 40 and viewers 92 can include paying a sender 40 a set price based on the number of times an advertisement is viewed, paying a sender 40 based on a scale that increases with volume of ad views, and paying a viewer 92 for viewing an advertisement. The payment can take the form of money, in-kind payments (e.g., free services), and other incentives, including special promotions based on the number of advertisements sent or viewed.

In FIG. 2, the computer 16 of the user's computer system 10 is shown. The box 18 is intended to schematically depict a user of a computer video input device, which device can be the computer 16 operating suitable software to generate digital video, or can be another such computer, or can be the web cam or video camera 12, or can be the video recording device 14, or the like. The video input device can be a Web camera, a personal computer, a laptop computer, a personal digital assistant or PDA, a video cassette recorder or VCR, a video camera, a movie camera, a video game console or any device that can be configured to upload video segments and images to the video server. The user begins by producing and or recording a video segment on the hard disk of the computer 16 or within the temporary memory of a handheld device. As a second step, the video segment of step 1 can optionally be compressed and/or can be changed as regards the computer file format in which it is recorded on the hard disk. This is depicted by arrows 11 and 13, between the steps of Produce/Record Video on the Hard Disk, and Possible Compression/Format Change to the Video.

As a third step, the video segment recorded on the hard drive of the computer 16 is transmitted with one or more identifiers to the host computer 60 that includes the VideoShare servers 62, 62' and the storage array 64. The video segment is stored under the control of the host computer 60, which can generate an identification tag that the host computer 60 can use to locate the stored video segment for retrieval and for viewing. A video segment can be uploaded to the video server over a network such as the Internet or by the use of wireless communication, or by a combination of both. The video server can include local or remote storage for storing the uploaded video images. A video segment can be accessed from the video server over a network such as the Internet or by the use of wireless communication, or by a combination of both.

In different embodiments, the identification tag can be provided to a user in the form of a URL, or can be embedded into a Web page on a remote site, or can be linked to a message. In one embodiment the message can be a still image that can be selected from the video segment. The third step is schematically depicted by the arrow 34a pointing generally from the computer 16 to the VideoShare servers 62, 62'.

A fourth step involves offering the sender 40 the opportunity to associate an advertisement with the uploaded video, as described before. This is represented by the arrows 34a and 34b, in a manner similar to that of FIG. 1B.

As a fifth step, the user who stored the video can send a message to an intended viewer, so that the viewer can access and view the video segment. The fifth step is schematically depicted by the arrow 17 pointing generally from the computer 16 to the computer 90 of the viewer. The box 92 is intended to schematically depict a user of a display device. In one embodiment, the display device can be the computer 90, or the display device can be a display device such as a Web TV, or can be a video output device such as a television set with a suitable decoder, or the like. The video output device can be any device that can be configured to allow a user to access and view the video segments and images including but not limited to a television, a computer, a PDA, a video camera, or a video game console. The display device can also be a wireless hand held device such as a PDA or a cellular telephone or the like.

In a fifth step, the viewer activates the viewing of the video segment. The viewer's action is indicated schematically by the arrow 19 pointing generally from the computer 90 to the server computer 62, 62'. In one embodiment the viewer activates a link by clicking a button, and the server computer 62, 62' responds by sending a streaming video segment that the viewer observe. The streaming video segment can in one embodiment be delivered as part of a video greeting card 81. In an alternative embodiment, the video can be delivered as a streaming video directly to the viewer from the host computer 60, without the viewer having to activate the host computer 60. The viewer 92 can, in different embodiments, take certain actions, as will be described below, in response to the video, it associated identifier, and the associated advertisement being send to the viewer 92. These actions will be addressed in more detail below.

Figure 3A:
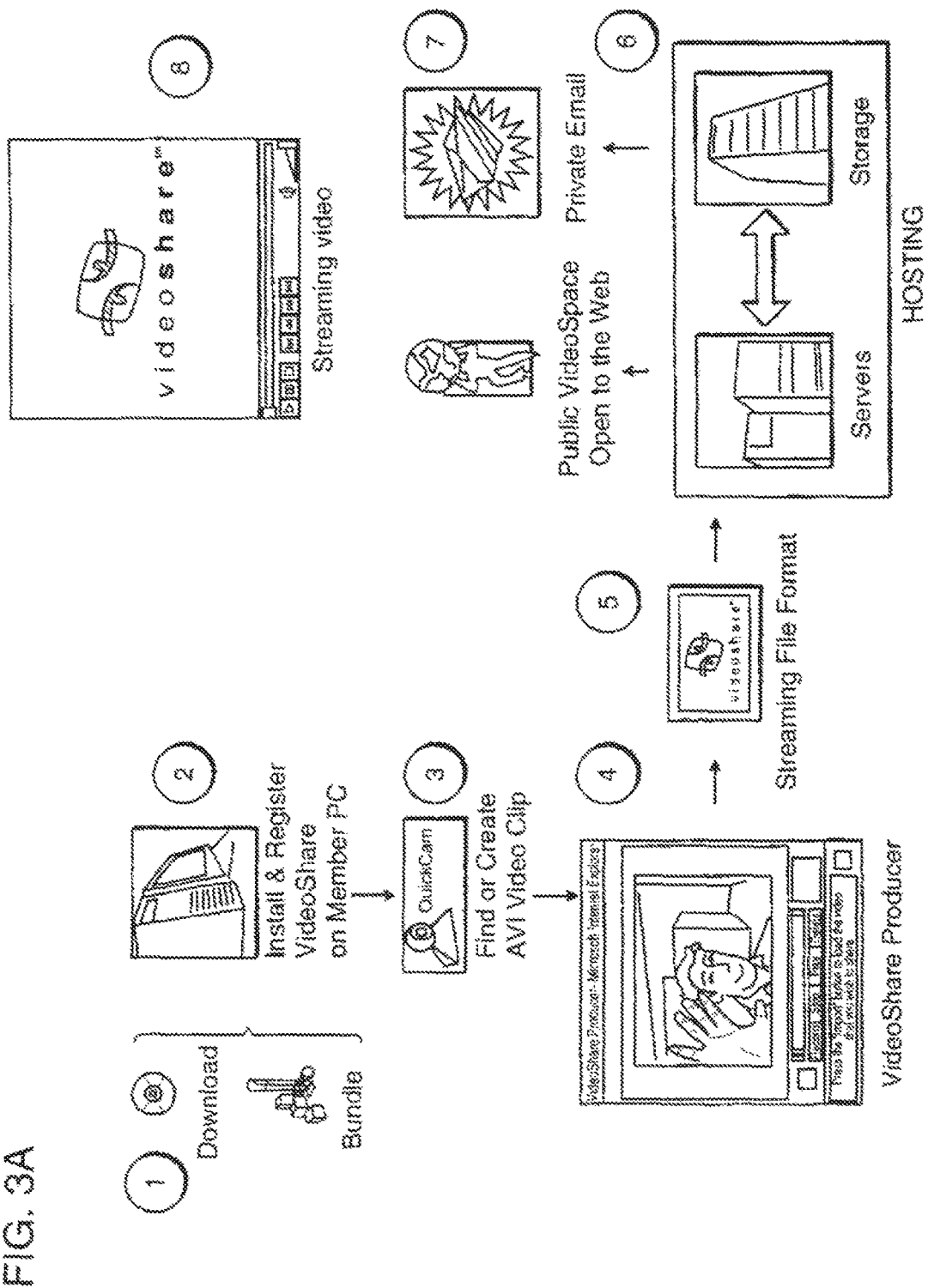
FIG. 3A is a functional block and flow diagram of an embodiment of the invention.

As shown in FIG. 3A, the user can obtain a copy of the VideoShare Producer 20 software by downloading a copy of the software from the Website www.VideoShare.com 50, as indicated by the picture at numeral 1. The term VideoShare Producer 20 software as used herein is intended to include the software that is required to interact with the host computer 60 to effectuate the necessary actions associated with dealing with advertisements. Alternatively, the user can obtain a copy of the VideoShare Producer 20 software on machine readable media such as a CD-ROM or the like. The VideoShare Producer 20 software can be bundled with one or more utility or application programs that are useful for a user to have, such as a "container" application so that the VideoShare Producer 20 software can be operated on a desktop computer. The user can install the VideoShare Producer 20 software on his or her computer 16 and can register with the VideoShare.com hosting service at no charge. In registering for the VideoShare service, the user obtains a username and a password that can be used to identify the user. The activity of installing the VideoShare Producer 20 software on the user's personal computer or the like and registering with the VideoShare system is indicated by the picture at the numeral 2.

In order to use the system, the user first obtains a video segment. The user can create the video segment, for example with a Web cam 12, or the user can use an existing video segment obtained from a video recorder 16, as indicated by the picture at the numeral 3. The VideoShare Producer 20 software has direct capture capabilities that permit the user to create the video segment.

The user can employ the VideoShare Producer 20 software to optionally compress the video; to determine if a video segment is in a format that is compatible with streaming video; to convert the video to a file format that is compatible with streaming video if the video segment is not already in a file format that is compatible with streaming video; and to transmit the video segment together with one or more identifiers that represent selections that the user can make (for example, a still image selected from the series of images that comprise the video segment, an identifier of the sender of the video segment (e.g., the user), an access privilege associated with the video segment, information indicative of a time period during which the video segment will be accessible, and information indicative of a number of instances that the video segment may be accessed). The identifier is associated with the video segment. The activities carried out in conjunction with the VideoShare Producer 20 software are generally indicated by the graphic at numeral 4.

The video segment and the identifier(s) are transmitted to the host computer 60 for storage and for later distribution. In one embodiment, the video segment is transmitted in a streaming video file format. This transmission activity is denoted by the graphic at numeral 5.

The video segment is stored under the control of the host computer 60, which can include one or more server computers 62 and storage array 64. The activity of receiving the video segment at the host computer 60 and storing the video segment and its identifier(s) is denoted by the pictures at numeral 6.

Depending on the choice of the user as to access privileges, the video segment can be stored as a publicly available video in a location in storage array 64 that has no restriction on access, or it can be stored in a portion of storage array 64 that requires some form of authorization to enable access, such as in a private email account area. The storage of the video segment as a public or private video segment is denoted by the pictures at numeral 7.

Upon request from a viewer who has the proper authorization, or upon any request in the case of a video segment available publicly, the host computer 60 sends the video in streaming video format to a viewer, who can observe the video in real time using a conventional web browser without additional plug-in modules. The activity of serving the video segment as a streaming video is denoted by the graphic at numeral 8.

Additional features of the software, that specifically deal with the interactions the sender 40 carriers out with the host computer 60 will be discussed in FIG. 3B and FIG. 3C.

Figure 3B:
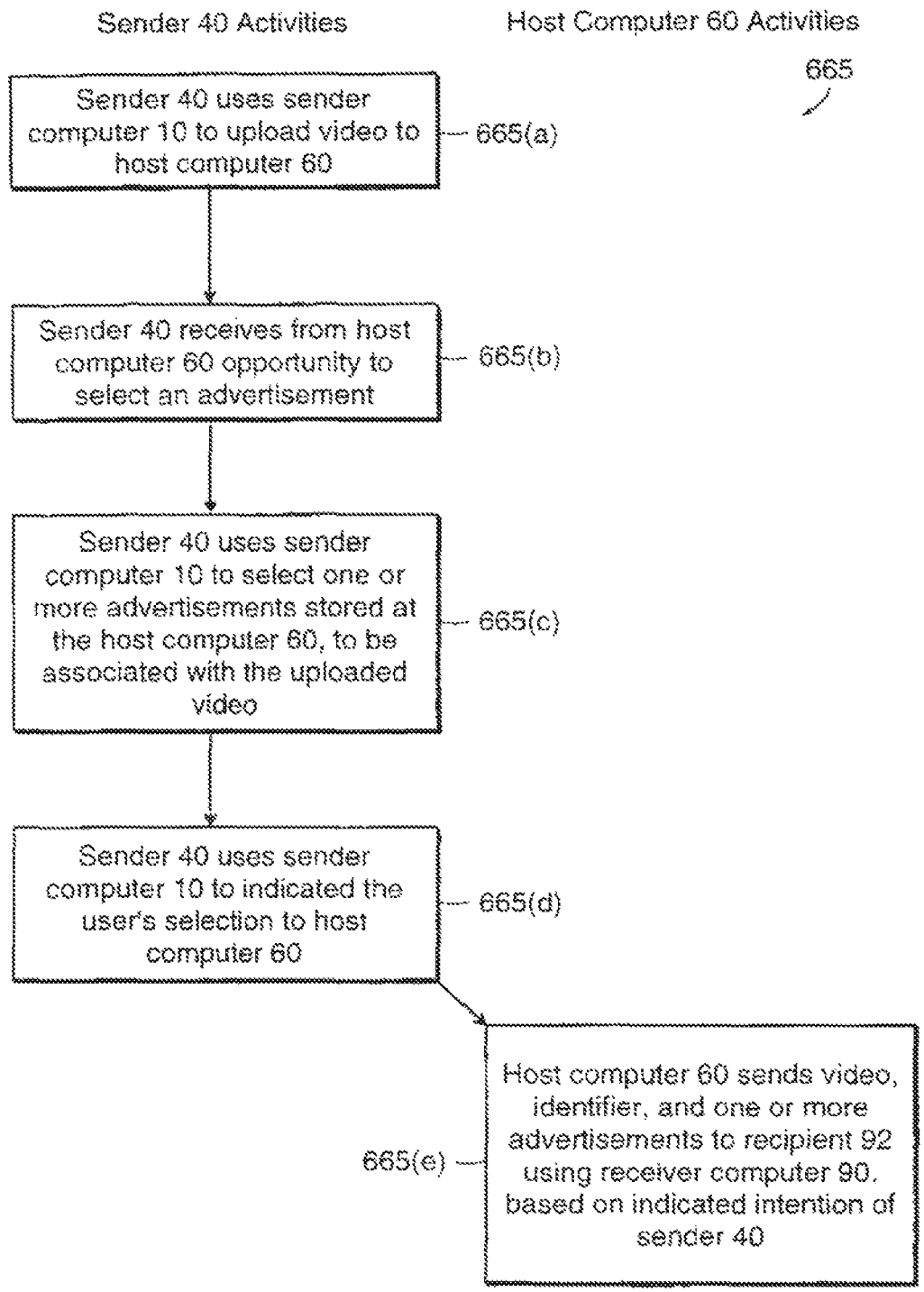
FIG. 3B is another functional block and flow diagram of an embodiment of the invention, showing from the sender's perspective the steps in associating a video with an advertisement.

FIG. 3B is another functional block and flow diagram of an embodiment of the invention, showing from the sender's perspective the steps in associating a video with an advertisement. At step 665(*a*), the sender 40 uses sender computer 10 to upload a video to host computer 60. At step 665(*b*), the sender 40 receives from host computer 60 an opportunity to select an advertisement from among those recorded or posted in advertisement database 63. At step 665(*c*), the sender 40 uses sender computer 10 to select one or more advertisements stored at the host computer 60, to be associated with the uploaded video. At step 665(*d*), the sender 40 uses sender computer 10 to indicate the user's selection to host computer 60. At step 665(*e*), the host computer 60 sends a video, its identifier, and one or more advertisements to a recipient 92 using receiver computer 90, based on indicated intention of sender 40.

Figure 3C:
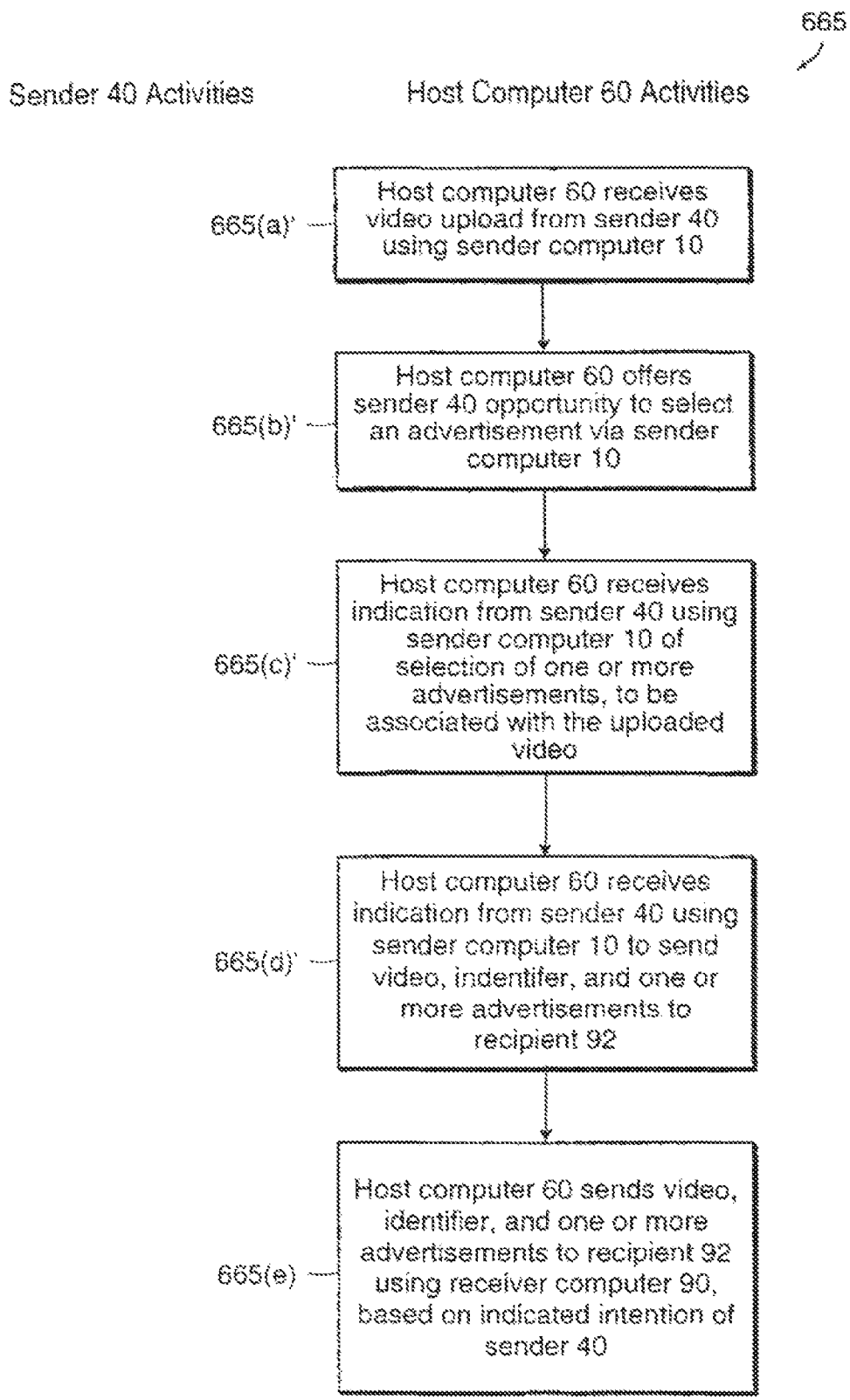
FIG. 3C is another functional block and flow diagram of an embodiment of the invention, showing from the host computer's perspective the steps in associating a video with an advertisement.

FIG. 3C is another functional block and flow diagram of an embodiment of the invention, showing from the host computer's perspective the steps in associating a video with an advertisement. In step 665(*a*)', the host computer 60 receives a video upload from the sender 40 using sender computer 10. In step 665(*b*)', the host computer 60 offers the sender 40 an opportunity to select an advertisement via sender computer 10. In step 665(*c*)', the host computer 60 receives an indication from the sender 40 using sender computer 10 of the selection of one or more advertisements, to be associated with the uploaded video. In step 665(*d*)', the host computer 60 receives an indication from the sender 40 using sender computer 10 to send a video, its identifier, and one or more advertisements to recipient 92. Optionally, step 665(*d*)' can be included in step 665(*c*)' by inference, or it can be explicitly performed. At step 665(*e*), the host computer 60 sends a video, its identifier, and one or more advertisements to a recipient 92 using receiver computer 90, based on indicated intention of sender 40.

FIG. 3B and FIG. 3C are identified as step 665 generally. Step 665 appears in each of FIG. 6A, FIG. 6B and FIG. 6C, where the one step is identified as "Select and associate advertisement." It is intended that FIG. 3B or FIG. 3C be referred to, as appropriate, in understanding that step 665 is in reality a series of substeps that involve both the sender 40 using his or her sender computer 10 and the host computer 60, both computers using software that is designed to support the necessary signaling and communication between the two computers. As those who are familiar with software will recognize, the software can equally well be replaced with firmware (e.g., software code committed to a memory such as a ROM or PROM or the like) or to hardware (e.g., circuitry designed to transmit and to accept signals that perform substantially the same functionality as the software). It is possible to use software, firmware and hardware in combination, or in substitution one for the other, to carry out such signaling and communication tasks. It is possible to program software using one or more different programming languages, with substantially the same effect.

The majority of the VideoShare Producer 20 software was developed as a Windows 95, Windows 98, and Windows 2000 ("Windows 9x/2000") compatible ActiveX control (e.g. an .OCX file), with additional components existing as active template library (ATL) component object model (COM) components that are instantiated during runtime. A "container application," named "VideoProducer.exe," allows the VideoShare Producer ActiveX Control to be executed from the Windows 9x/2000 desktop. The VideoShare Producer Active X Control can also be embedded into a web page, as is done within the www.VideoShare.com 50 web site.

The custom written VideoShare Producer 20 software includes the following binary/source code components: (1) VideoShare Producer ActiveX Control (VideoProducer.ocx); (2) JPEG ATL COM component (jpeg.dll); (3) Thumbnail Acquisition DirectShow (ThumbnailFilter.ax); (4) Extended MAPI interface (MapiExAPI.dll); (5) ICQ interface (icqglue.dll); AND (6) VideoShare Upload/Database Server (vpserver.exe).

All components, except for significant portions of the JPEG component that uses public domain source code, were entirely written by VideoShare Inc. The VideoShare Upload/Data Server constantly runs at the VideoShare Hosting Facility, an embodiment of the host computer 60, with which an installed instance of the VideoShare Producer 20 software on a user's computer 16 can be in constant communication. The VideoShare Producer 20 software client/server structure allows the user to upload videos to his or her account through the "Save and Share" button that is described later.

The VideoShare Producer 20 software is built upon the following third-party technologies that provide lower-level device support, document sharing, and file format conversion: (1) Microsoft's DirectShow; (2) Microsoft's Windows Media Technologies; (3) Microsoft's Video for Windows; (4) MAPI; AND (5) ICQ.

Figure 4:
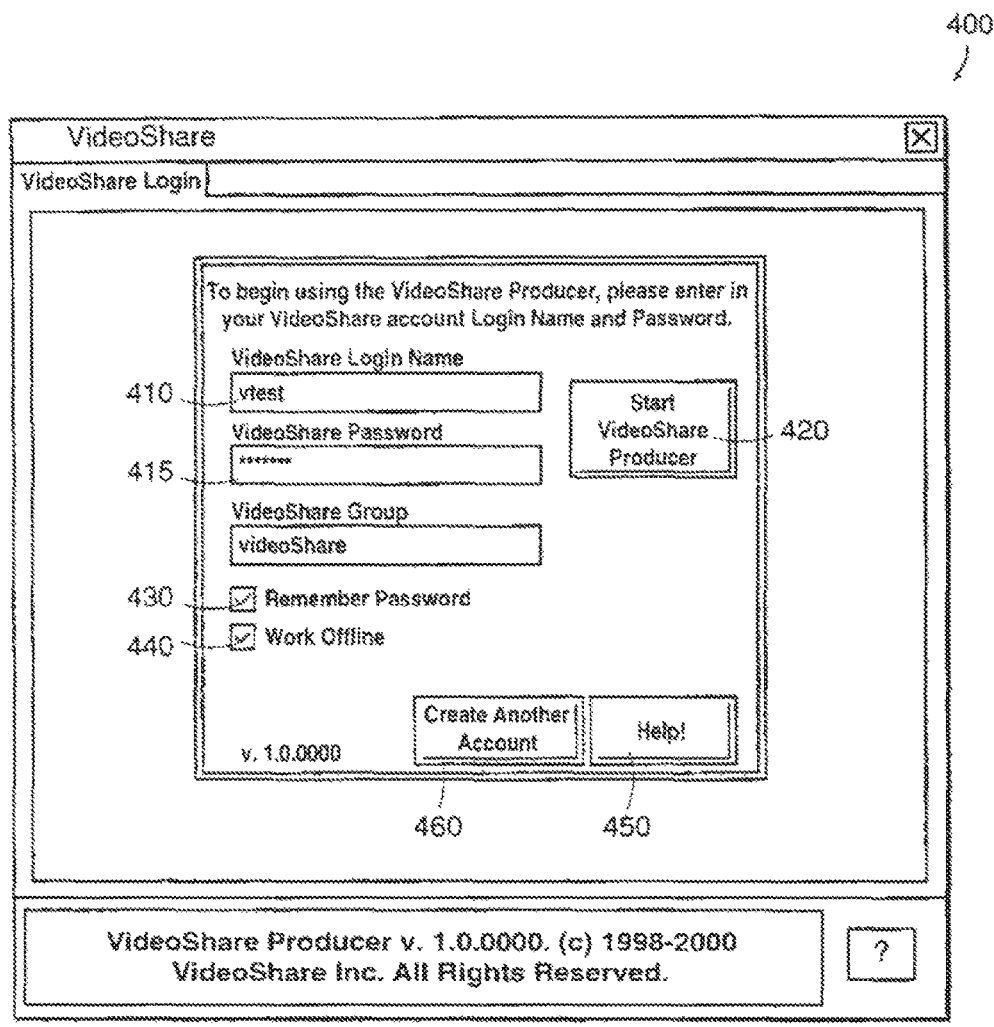
FIG. 4 is a login screen on a user's computer, in one embodiment of the invention.

When the user launches the VideoShare Producer 20 software, he or she will see the window depicted in FIG. 4 appear on his or her computer 16 operating the Win9x/2000 operating system. The login screen can be made optional for repeat users by providing a unique identifier for the user, such as a password, or by installing on the user's computer or the like a record similar to the "cookies" used by some interactive computer systems operating on a network such as the Internet.

When the user enters in his or her username in the box 410 labeled VideoShare Login Name and his or her password in the box 415 labeled VideoShare Password and activates the "Start VideoShare Producer" button 420, the VideoShare Producer 20 software opens a TCP/IP socket connection to the VideoShare Upload/Database Server via port 80 in order to avoid typical Firewall and/or Proxy Server problems. If the box 430 labeled Remember password is checked, the VideoShare Producer 20 software will remember the user's password, eliminating the necessity to type in that information each time the software is started. The VideoShare Upload/Database Server then verifies the validity of the username/password. Furthermore, the VideoShare Producer 20 software will notify the user if there is a ore recent version of the software available, giving him or her the opportunity to automatically download and install the new software.

Also at this point, the user can choose to work offline by checking box 440 "Work offline", which suspends communications to the VideoShare Upload/Database Server until the user has filled his or her "Sharing Queue" as describe later. The ability to work offline is principally of use for people with computers that do not have a continuously open Internet connection, e.g. computers that use telephone modems rather than high speed connections or equipment such as cellular telephones or hand held devices that require the user to dial in to establish a connection. With this login dialog, the user can also receive help, by activating the "Help" button 450, taking the user to a web page on the VideoShare web site. The login dialog box can also be used to create a new VideoShare user account, by clicking the "Create Another Account" button 460.

Once the login process has been completed, the VideoShare Producer 20 software looks for available DirectShow audio and video capture devices. These available devices are enumerated and listed within the "Settings Tab" as described later. The VideoShare Producer 20 software initializes the audio and video capture device, by recalling as a default the device that was used most recently.

VideoShare Producer Preview/Capture Import Process

Figure 5:
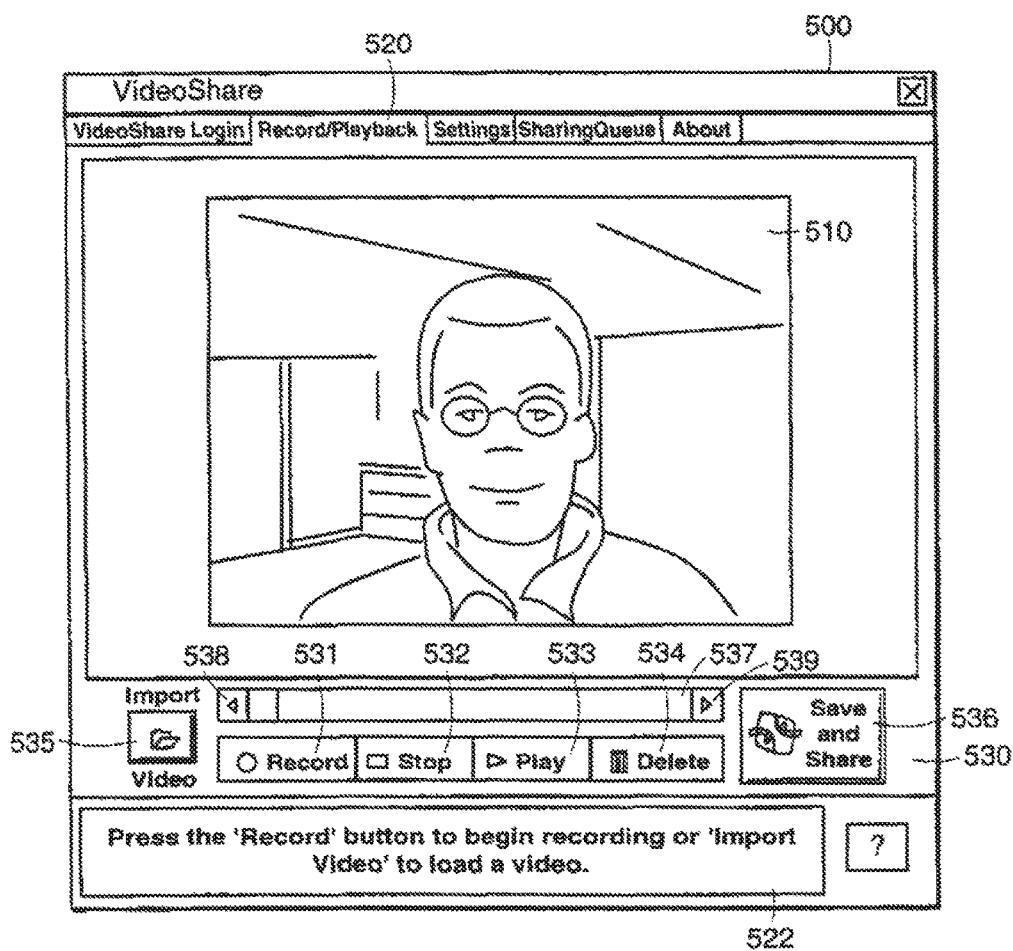
FIG. 5 is a record/playback screen as seen by the user, in accordance with an embodiment of the invention.

After the capture device initialization, the VideoShare Producer 20 software displays the window depicted in FIG. 5.

The image 510 in the middle of the window is the video input stream from the initialized, default video capture source. The image in FIG. 5 is that of an employee of the assignee of the present invention, in the offices of the assignee. The VideoShare Producer 20 software automatically builds a DirectShow "preview graph" where the video stream from the video device is displayed on the screen, but is not saved to disk. This gives the user the opportunity to adjust the camera, e.g. an opportunity to correct the camera position, the camera focus, the camera angle, the magnification of the image, and the like.

At the top of this window, the user is presented with five different "tabs", each presenting the user with different aspects of the VideoShare Producer 20 software. In FIG. 5, the tab labeled "Record/Playback" 520 is active, indicating that the VideoShare Producer 20 software is ready to acquire and/or display a video segment.

At the bottom of the window, there is a status message 522 that displays the current operation of the VideoShare Producer 20 software. In FIG. 5, the status message 522 prompts the user to either activate the Record button 531 to create a new video segment, or to import an existing video segment by activating the Import Video button 535, both of which are described in more detail below.

Directly below the video preview image 510 is a Capture/Playback Control Panel 530 that includes the following items:

Record button 531 which begins a new audio/video capture;

Stop button 532 which terminates an active audio/video capture operation;

Play button 533 which initiates the playing back of the last recorded or imported video;

Delete button 534 which cancels the last record or import operation and begins a new video preview;

Import Video button 535 which allows the user to select a pre-existing video file from his or her hard drive;

Save and Share button 536, which in the present embodiment activates software modules that convert the current video file into a compressed streaming format, upload that converted file to the VideoShare web site, and give the user options to distribute that video to other people; and Shuttle Bar 537 which is used to control the current position of the playback file together with forward button 537 and reverse button 538, allowing the user to rewind and fast forward through the current video.

The software modules that operate upon the activation of Save and Share button 536 will be covered in a subsequent section in this document in detail.

When the user begins to record a video, the VideoShare Producer 20 software builds a new "Capture Graph" that renders the video stream to both the display window as well as to a temporary AVI file on the user's hard drive. The audio/video capturing continues until the user activates the "Stop" button 532 at which point the VideoShare Producer 20 software stops the "Capture Graph", destroys the DirectShow filter, builds a Direct Show "Playback Graph", and displays the first frame of the captured video as video preview image 510. When the user activates the Play button 533 the DirectShow "Playback Graph" is put into running mode, playing back the entire recorded video from beginning to end.

The user can also choose to import a pre-existing video, which in one embodiment can be a file format selected from the AVI, MPEG, or QuickTime file formats, by activating the Import Video button 535. The VideoShare Producer 20 software automatically renders the correct DirectShow filter to display an imported video correctly.

Save and Share Process

Figure 6A:
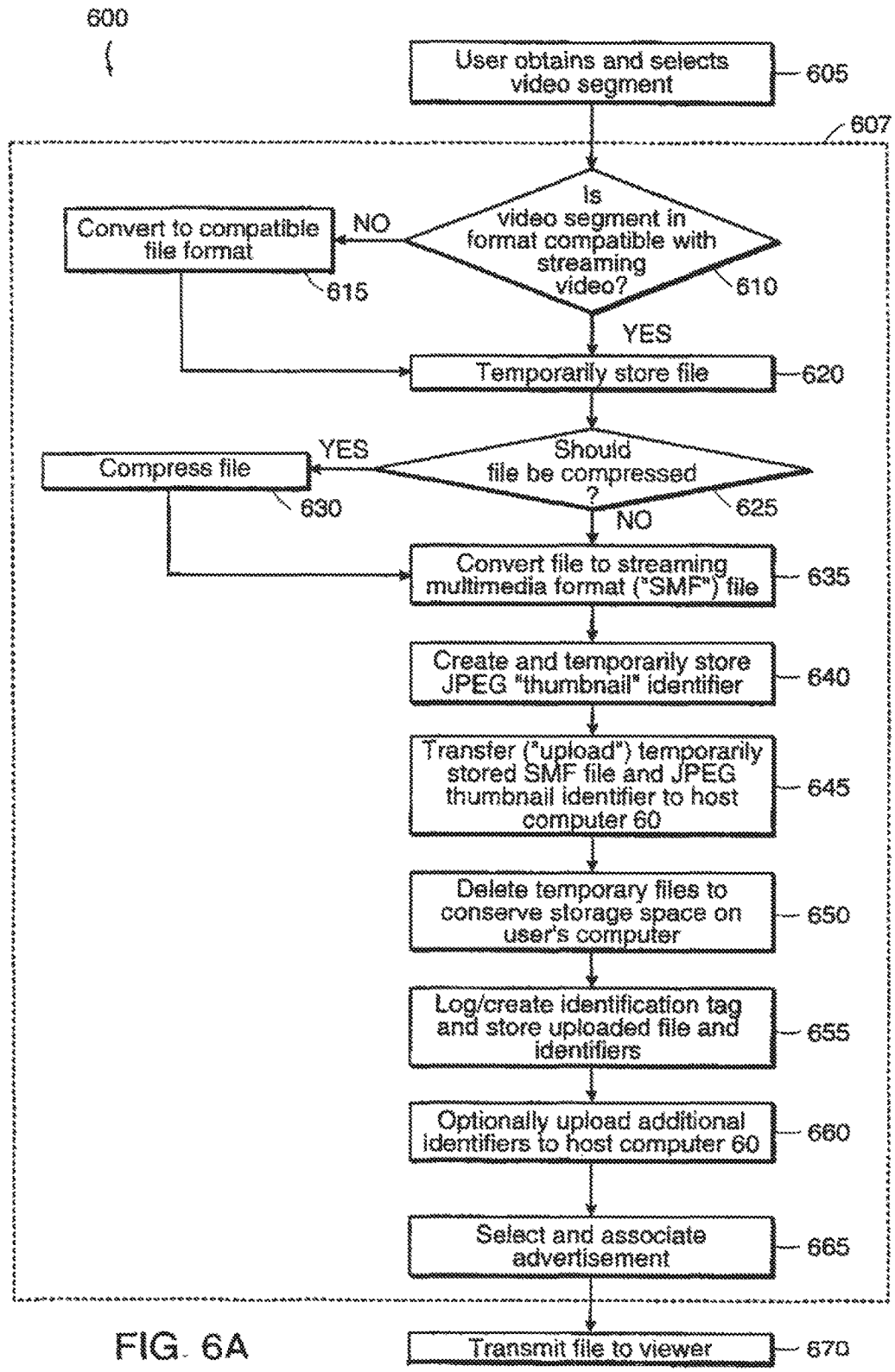
FIG. 6A is a flow diagram of an embodiment of the invention in which software automates a number of steps in connection with the uploading of a video segment.

Once a video segment has been recorded or imported into the user's computer 16 that is running the VideoShare Producer 20 software, the user can choose to process the video segment with various optional alternatives by activating the Save and Share button 536. When the Save and Share button 536 is activated, the video segment is archived and distributed automatically. The VideoShare Producer 20 software greatly simplifies the entire process by seamlessly automating the following steps that are depicted in FIG. 6A:

Video file format conversion, as required;

Compression to a streaming multimedia format at a user-specified bitrate;

Creating a "Thumbnail" JPEG snapshot of the video file, as an identifier that a user or a viewer can observe in order to assess the content of the video segment;

Transferring the resultant video and thumbnail files to the VideoShare server computers 62, 62';

Logging the transactions and managing the user's storage account, including causing the generation of an identification tag that the server computers 62, 62' can employ to retrieve the video segment for viewing; and Automating several possible methods of distributing the video to third party recipients, e.g., viewers.

In addition, the user (or sender of the video) is given the opportunity to select an advertisement from one or more advertisements that have been posted on the VideoShare host computer 60 by advertisers who pay for such advertisements. The user or sender can decide, based on the sender's knowledge or opinion about the recipient of the video that the sender is sending, what kind of advertisement is appropriate, the sender can select the advertisement based on one or more criteria. For example, the sender may know an interest of the recipient and can use a criterion based on the recipient's interests, such as the type of product or service that the recipient may be interested in. The sender may know how willing the recipient is to watch an advertisement, and can select an advertisement based on the criterion of how long the advertisement is. The sender can select an advertisement based on a criterion of how much the advertiser is willing to pay the sender to attach the advertiser's advertisement rather than another advertisement. The sender may not have a preference, and can make a selection that leaves the choice of an advertisement up to the VideoShare host computer 60. The VideoShare host computer 60 can select an advertisement on the basis of a random selection from all the advertisements available, or can make the selection based on other criteria, such as the price paid by the advertiser, an agreed frequency of presentation of an advertisement, or other criteria.

FIG. 6A shows a flow diagram 600 of an embodiment of the invention in which the VideoShare Producer 20 software automates a number of steps in connection with uploading a video segment by activation of the Save and Share button 536 described in FIG. 5. As indicated at box 605, a user first obtains and selects a video segment for processing for distribution. The box 605 schematically encapsulates all of the actions that a user takes as described in relation to FIGS. 4 and 5 above. When the user activates the Save and Share button 536 the actions described below that are enclosed by the dotted line 607 are automatically carried out under the control of the VideoShare Producer 20 software.

The VideoShare Producer 20 software subjects the selected video segment to analysis to determine whether the selected video segment is or is not in a file format that is compatible with a streaming video format, as indicated at diamond 610. Formats that are compatible with streaming media formats include formats such as MPEGs and QuickTime videos. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The apparatus and method of the invention can include compression techniques to manage large video segments and image files. Video segments and image files can be compressed by the video sender before being uploaded to the server or can be compressed by the server itself. Compression can be used to improve the efficiency of transmission and to improve the use of storage.

The stored temporary file representing the selected video is then analyzed by the VideoShare Producer 20 software, as represented by diamond 625, "Should file be compressed?" to determine if the temporarily stored file should be compressed. If the software determines that the file should be compressed, as indicated by the arrow labeled "YES" that points from the diamond 625 to the box 630, labeled "Compress file," the file is compressed. The compression involves compressing the video file to a user-specified bitrate, or the bandwidth that is required to view the video without disruption in the transmission. The user can select the desired bitrate via the "Settings Tab" that is described in more detail below. The file is then converted to a streaming multimedia format file as indicated by the box 635, labeled "Convert file to streaming multimedia format ("SMF") file," as denoted by the arrow pointing from the box 630 to the box 635. If the file is not to be compressed, the flow follows the arrow labeled "NO" pointing from the diamond 625 to the box 635, and the file is then converted to a streaming multimedia format file as schematically represented by the box 635.

The process that is performed by the VideoShare Producer 20 software as denoted by the box 635 involves reading in the video file, frame by frame, and converting the video into a streaming multimedia format. In one embodiment, the VideoShare Producer 20 software uses the Windows Media Streaming Format, known as ASF or WMF, but it is not technologically restricted to this choice. The Windows Media Streaming Format comprises MPEG 4 v3 for the video stream and the Windows Media Audio format for the audio stream. The output of this file is stored as a temporary file on the user's hard drive, in one embodiment.

The flow diagram indicates that the process makes a "thumbnail" of the video file, as represented schematically by the box 640, labeled "Create and temporarily store JPEG 'thumbnail' identifier." The VideoShare Producer 20 software produces a JPEG still image that is used as a reference image to the entire video file. It is an identifier of the subject matter or content of the video that a user or a viewer can readily recognize, as compared to an alphanumeric string such as a typical string used to identify a file by its drive, directory (and one or more subdirectories) and filename. Such alphanumeric identifiers are useful, but may be totally uninformative as to the content or subject matter contained in the identified file or video segment. In one embodiment, the VideoShare Producer 20 software creates the "thumbnail" by taking the "middle" image of the entire video file, as measured by the temporal duration of the file. In another embodiment, the selection of an image from which to make the "thumbnail" can be left to the discretion of the user. This JPEG file is also stored as a temporary file on the user's hard drive, in one embodiment.

The next part of the process is the upload operation, in which the VideoShare Producer 20 software contacts the host computer 60, which in one embodiment is the VideoShare Upload/Database Server at the VideoShare hosting facility. This portion of the automated process is denoted by the box 645 labeled "Transfer ("upload") temporarily stored SMF file and JPEG thumbnail identifier to host computer 60." The VideoShare Producer 20 software notifies the host computer 60 that the user wishes to place his or her video into a repository maintained by the host computer 60, which in one embodiment can be the VideoShare VideoCenter, which is a repository of all recorded and uploaded videos to date. This upload is performed automatically via a direct TCP/IP socket connection over a specific connection port of the user's computer known as port 80. The VideoShare Producer 20 software uses a standard communications protocol to perform this transfer to the host computer 60. In another embodiment, a proprietary protocol can be used, for example if one wants to maintain the security of information contained in the video segment. In another embodiment, the video segment can be encrypted in order to provide enhanced security. Both the compressed video streaming multimedia file and the thumbnail image are uploaded at substantially the same time.

As schematically depicted by box 650, labeled "Delete temporary file to conserve storage space on user's computer," the VideoShare Producer 20 software removes all of the temporary files that were created in the course of the automated processing described above. This feature provides for the user a convenient, secure, and transparent process, with the benefit that the user's computer storage device(s), for example one or more hard drives, do not become cluttered with unnecessary and obsolete files.

Once the upload has been completed, the VideoShare Producer 20 software and the host computer 60 (for example, the VideoShare Upload/Database Server) will update the user's account to account for the required storage space that the video requires. The necessary logging, creation of an identification tag, and storing of the video and the associated identifier or identifiers is also performed automatically, as schematically depicted by box 655.

The user can optionally add additional identification and control information about the user, and about how and under what conditions the video is to be made available for distribution, as schematically indicated by box 660. The process by which some of this information is collected is discussed below with regard to FIG. 8. The user is automatically prompted to provide this information, but has the option to forego making a decision immediately.

The user is given an opportunity to select an advertisement that will be associated with the video, as schematically indicated by box 665, and as discussed in more detail below.

The transmission of video segment files to viewers is discussed in more detail below, and is represented in FIG. 6 by the box 670 labeled "Transmit file to viewer" which is outside the region 607 as an indication that the transmission of files to viewers is an action beyond the material discussed above in conjunction with the Save and Share button 536 of FIG. 5.

Figure 6B:
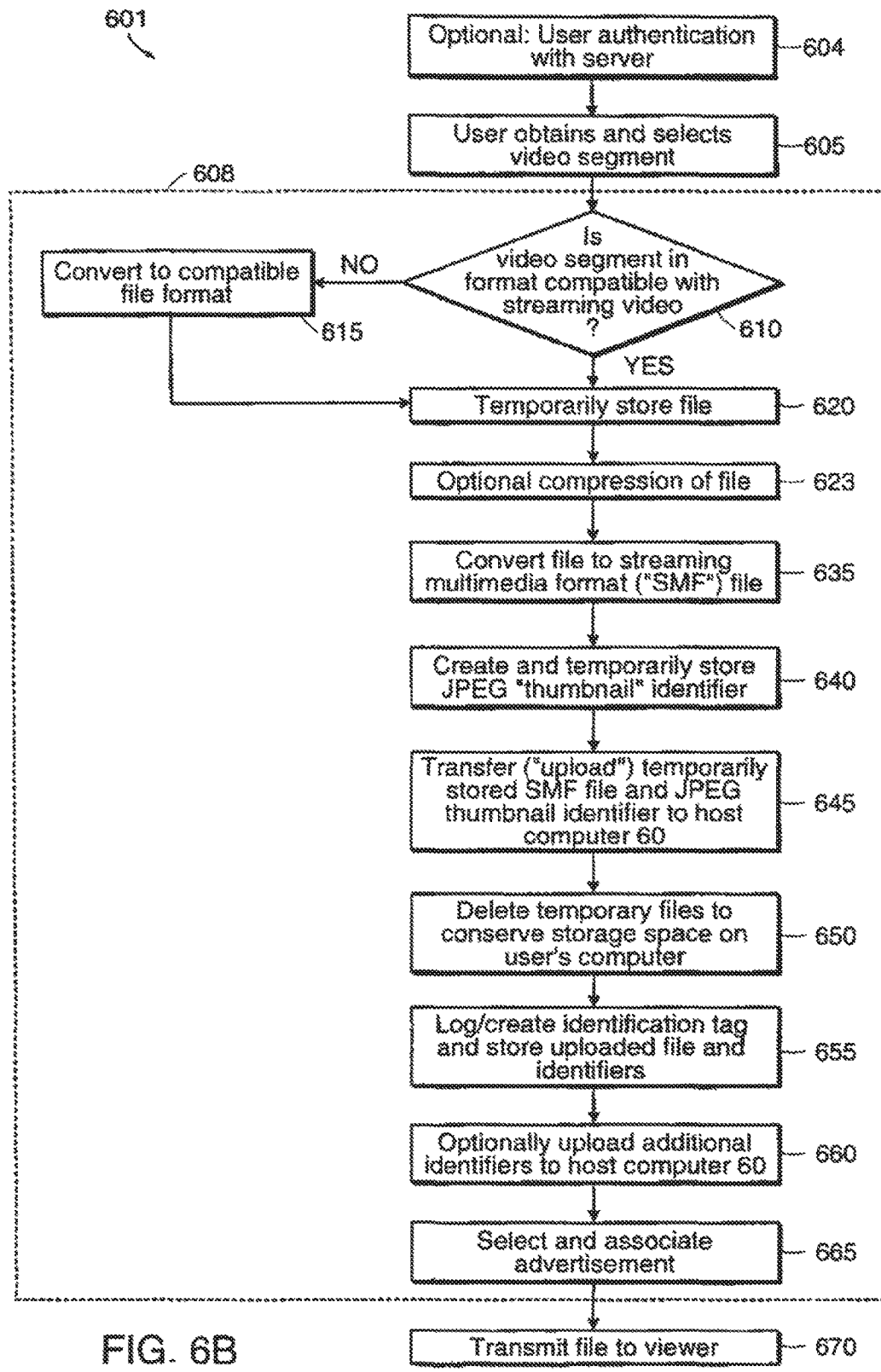
FIG. 6B is a flow diagram of another embodiment of the invention in which software automates a number of steps in connection with the uploading of a video segment.

FIG. 6B shows a flow diagram 601 of another embodiment of the invention in which software automates a number of steps in connection with uploading a video segment. Many of the steps already described in connection with FIG. 6A also occur in the embodiment depicted in FIG. 6B, and are numbered in the same manner as in FIG. 6A. In FIG. 6B, there is first an optional step indicated by the box 604 labeled "Optional: User authentication with server" in which the User is optionally required to provide identification, such as a user name and password, that authenticates the identity of the user to the server or host computer 60. The user then obtains and selects a video segment for processing for distribution, as indicated at box 605 that schematically encapsulates all of the actions that a user takes as described in relation to FIGS. 4 and 5 above. When the user activates the Save and Share button 536 the actions described below that are enclosed by the dotted line 608 are automatically carried out under the control of the VideoShare Producer 20 software.

As discussed in relation to FIG. 6A, the VideoShare Producer 20 software subjects the selected video segment to analysis to determine whether the selected video segment is or is not in a file format that is compatible with a streaming video format, as indicated at diamond 610. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The stored temporary file representing the selected video is then analyzed by the VideoShare Producer 20 software, and optionally compressed as represented by the box 623 labeled "Optional compression of file." The file is then converted to a streaming multimedia format file as indicated by the box 635, labeled "Convert file to streaming multimedia format ("SMF") file." Alternatively, a file from the box 620 can be uploaded to the host computer 60 without being converted to a streaming format, and the conversion to a streaming video format can be accomplished at the host computer 60. The process that is performed by the VideoShare Producer 20 software as denoted by the box 635 involves reading in the video file, frame by frame, and converting the video into a streaming multimedia format.

The flow diagram indicates that the process makes a "thumbnail" of the video file, as represented schematically by the box 640, labeled "Create and temporarily store JPEG "thumbnail" identifier."

The next part of the process is the upload operation, in which the VideoShare Producer 20 software contacts the host computer 60, which in one embodiment is the VideoShare Upload/Database Server at the VideoShare hosting facility. This portion of the automated process is denoted by the box 645 labeled "Transfer ("upload") temporarily stored SMF file and JPEG thumbnail identifier to host computer 60." Both the compressed video streaming multimedia file and the thumbnail image are uploaded at substantially the same time.

As schematically depicted by box 650, labeled "Delete temporary file to conserve storage space on user's computer," the VideoShare Producer 20 software removes all of the temporary files that were created in the course of the automated processing described above. This feature provides for the user a convenient, secure, and transparent process, with the benefit that the user's computer storage device(s), for example one or more hard drives, do not become cluttered with unnecessary and obsolete files.

Once the upload has been completed, the VideoShare Producer 20 software and the host computer 60 (for example, the VideoShare Upload/Data Server) will update the user's account to account for the required storage space that the video requires. The necessary logging, creation of an identification tag, and storing of the video and the associated identifier or identifiers is also performed automatically, as schematically depicted by box 655.

The user can optionally add additional identification and control information about the user, and about how and under what conditions the video is to be made available for distribution, as schematically indicated by box 660. The process by which some of this information is collected is discussed below with regard to FIG. 8. The user is automatically prompted to provide this information, but has the option to forego making a decision immediately.

The user is given an opportunity to select an advertisement that will be associated with the video, as schematically indicated by box 665, and as discussed in more detail below.

The transmission of video segment files to viewers is discussed in more detail below, and is represented in FIG. 6B by the box 670 labeled "Transmit file to viewer" which is outside the region 608 as an indication that the transmission of files to viewers is an action beyond the material discussed above in conjunction with the Save and Share button 536 of FIG. 5.

Figure 6C:
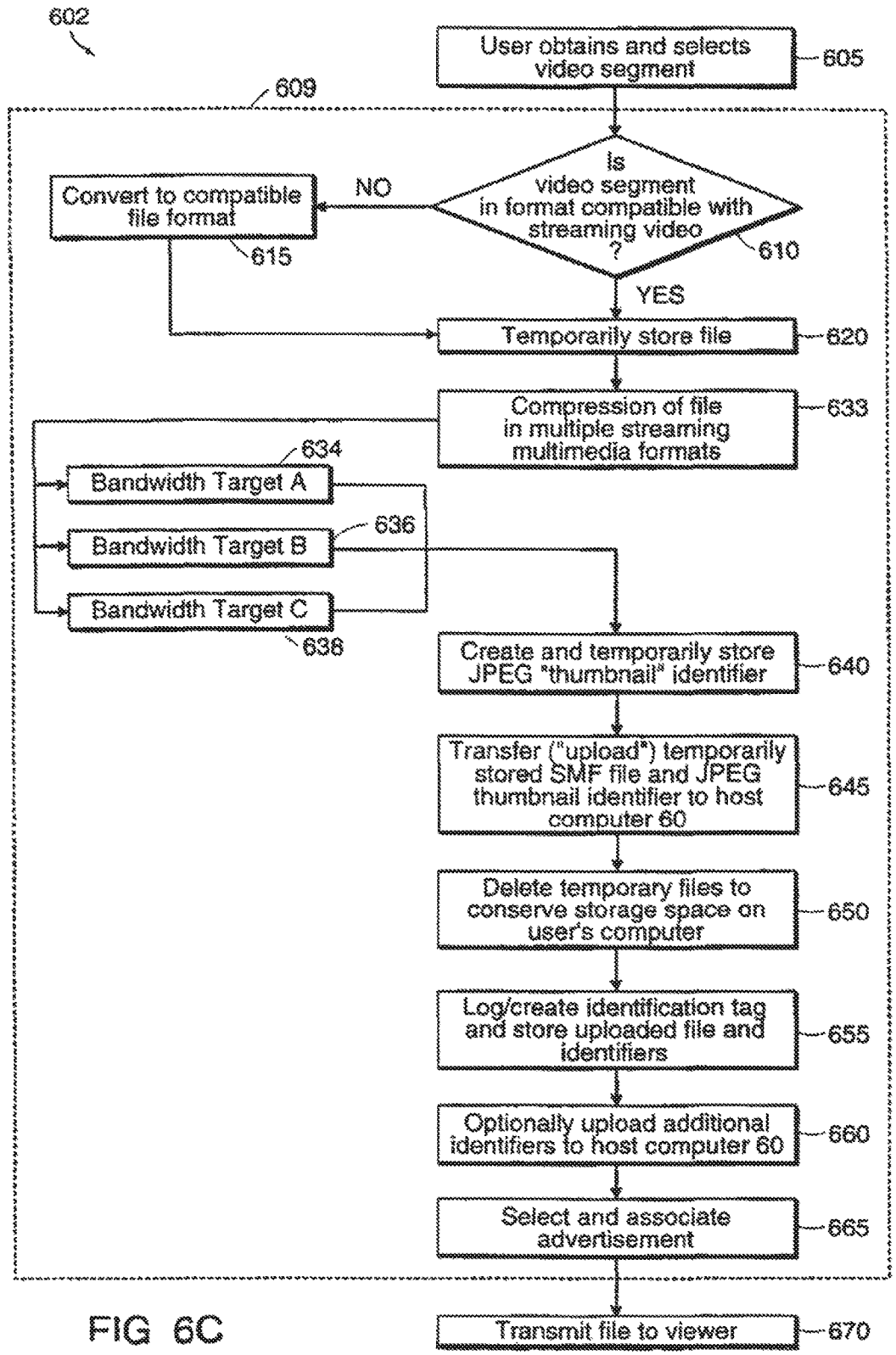
FIG. 6C is a flow diagram of an embodiment of the invention in which software automates a number of steps in connection with the formatting of a video segment.

FIG. 6C shows a flow diagram 602 of an embodiment of the invention in which software automates a number of steps in the formatting of a video segment. In particular, in this embodiment, the video segment that the user wishes to provide in streaming video format is compressed into a plurality of formats, each of which is encoded for optimal display at a different transmission bitrate. There can be a benefit to recording the same video segment in multiple formats. For example, a casual viewer may have only a slow speed modem, such as a 28.8 kilobaud (kB) modem. For such a viewer, the slow transmission speed can make the size of a file a critical feature. Such a user can view a video in real time if it is formatted for a 28.8 kB modem, but not if it is formatted for appreciably higher transmission speeds. Another user, for example, one who has a TI connection that can handle transmission speeds up to approximately 1.5 megabaud, could successfully receive a version of the same video segment that is formatted for higher transmission speeds, with the possibility of having a better quality image and higher resolution, perhaps with better audio as well. The TI user could see the version of the video segment intended for 28.8 kB transmission if he or she wanted to, but might prefer to see a video segment that appeared to be more professional in quality. By using a system that can automatically discriminate the transmission speed capabilities of the hardware that the user employs, the embodiment allows each user to view a version of the video segment that is optimally configured for the user's hardware.

In particular, the steps of the method enclosed within the dotted rectangle 609 are automated by software that embodies the present invention. As described above, the user obtains and selects a video segment for processing for distribution, as indicated at box 605 that schematically encapsulates all of the actions that a user takes as described in relation to FIGS. 4 and 5 above. When the user activates the Save and Share button 536 the actions described below that are enclosed by the dotted line 609 are automatically carried out under the control of the VideoShare Producer 20 software.

As discussed in relation to FIG. 6A, the VideoShare Producer 20 software subjects the selected video segment to analysis to determine whether the selected video segment is or is not in a file format that is compatible with a streaming video format, as indicated at diamond 610. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The temporarily stored file is then compressed in multiple streaming multimedia formats, as denoted by the box 633. In the present example, three files will be used to describe the process, but it should be understood that more or fewer than three formats may be created at substantially the same time. The resulting multiple files are denoted by the three boxes 634, 636 and 638 labeled "Bandwidth Target A," "Bandwidth Target B," and "Bandwidth Target C," respectively. Each file is optimally encoded for play as a streaming video segment at a particular transmission rate and bandwidth, such as 28.8 kB, 56 kB, 100 kB, 300 kB, or other transmission rates.

As described above, the method includes a step of creating and temporarily storing a "thumbnail" identifier, as denoted by the box 640. Rather than transmitting one video segment in one SMF with one thumbnail, the embodiment of FIG. 6C transmits all the files 634, 636 and 638 in association with the single thumbnail and any other identifiers that are selected as appropriate. For example, each SMF file can be identified as to its bandwidth. In an alternative embodiment, the system transmits only a single SMF file with its associated identifiers, including the JPEG "thumbnail," and the multiple bandwidth variants of the SMF file are generated at the host computer 60. This embodiment may be advantageous when the user has only a slow speed modem, and would be severely time constrained by having to upload multiple files.

The remaining steps of this embodiment, as denoted by the boxes 650, 655, 660, 665 and 670, correspond substantially to the steps in FIG. 6A represented by the boxes identified with the corresponding numerals. It should be noted that the precise order of some of the steps, for example, the step denoted by the box 655, and the step denoted by the box 650, can be interchanged without a different outcome of the overall process. Other such interchanges in sequence are possible as well, again without a different outcome of the overall process.

Figure 6D:
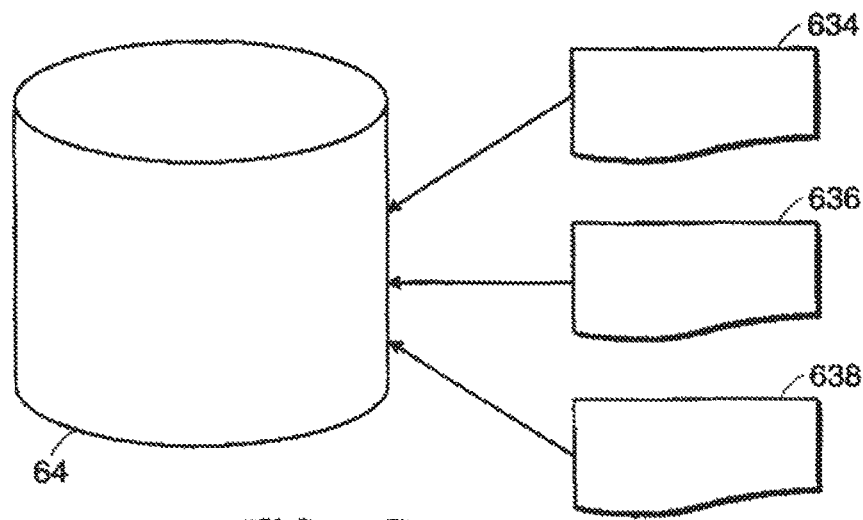
FIG. 6D shows the relationship of some of the files created in the flow diagram of FIG. 6C.

FIG. 6D depicts an embodiment of the database 64 of the host computer 60 on which are recorded the three exemplary bandwidth target files 634, 636 and 638 for FIG. 6C. These files are available for delivery over a computer network to a viewer. The files 634, 636 and 638 represent three versions of the same video segment in streaming multimedia format, each suitable for optimal viewing by a user having hardware operating at the transmission rate corresponding to the format of one of the files.

Figure 6E:
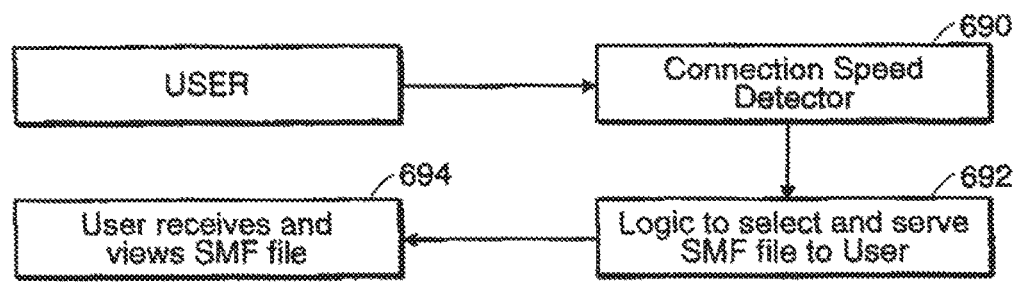
FIG. 6E is a flow diagram of a method by which an optimally formatted video segment is sent to a user according to the invention.

As shown in FIG. 6E, the user (or the viewer) transmits to the host computer 60 a request for a particular video segment, denoted by the arrow from the box labeled "USER" to the box 960 labeled "Connection Speed Detector." Host computer 60 can include hardware that can sense the transmission speed of a user computer 16, or of a computer used by a person desiring to view a video segment. Alternatively, the host computer 60 can inquire of the computer on the network that is connected to the user computer 16 or the computer of a viewer about the speed of connection that is being maintained. When the information is available to the host computer 60, the host computer 60 can determine which file of the files exemplified by 634, 636 and 638 is most appropriate to serve to the user or viewer, as denoted by the box 692 labeled "Logic to select and serve SMF file to User." The host computer 60 then transmits the appropriate file to the user, as denoted by the arrow from the box 692 to the box 694 labeled "User receives and views SMF file." Alternatively, the viewer can request the transmission of a file encoded at a specific bitrate.

Figure 7:
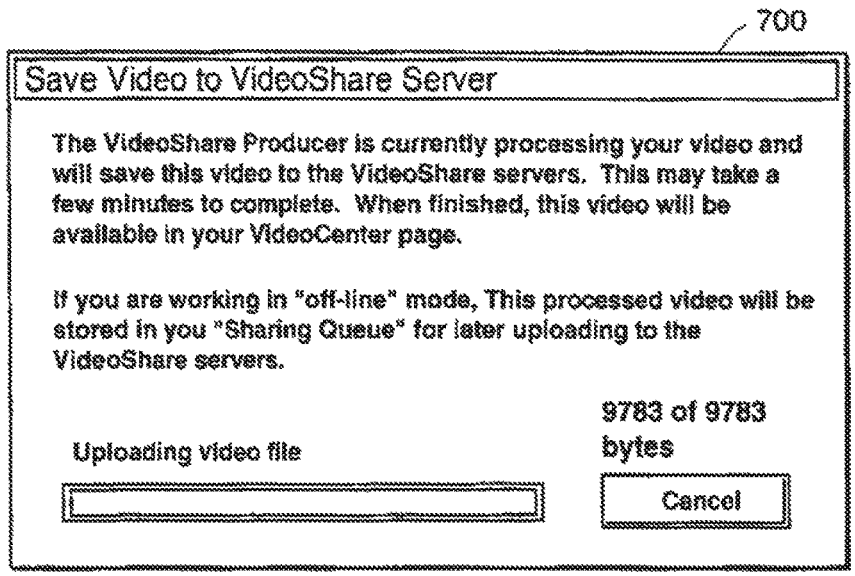
FIG. 7 is a screen as seen by the user, the screen indicating that file processing is occurring.

When the user begins the process described in relation to FIG. 6A, in one embodiment, the "Progress Dialog" screen 700 depicted in FIG. 7 is presented, reflecting the status of the process in real time. The "Progress Dialog" screen 700 notifies the user about the total number of bytes that have to be uploaded to perform the transfer and it also informs the user of the number of bytes and the percentage of the file that have been uploaded in real time.

Figure 8:
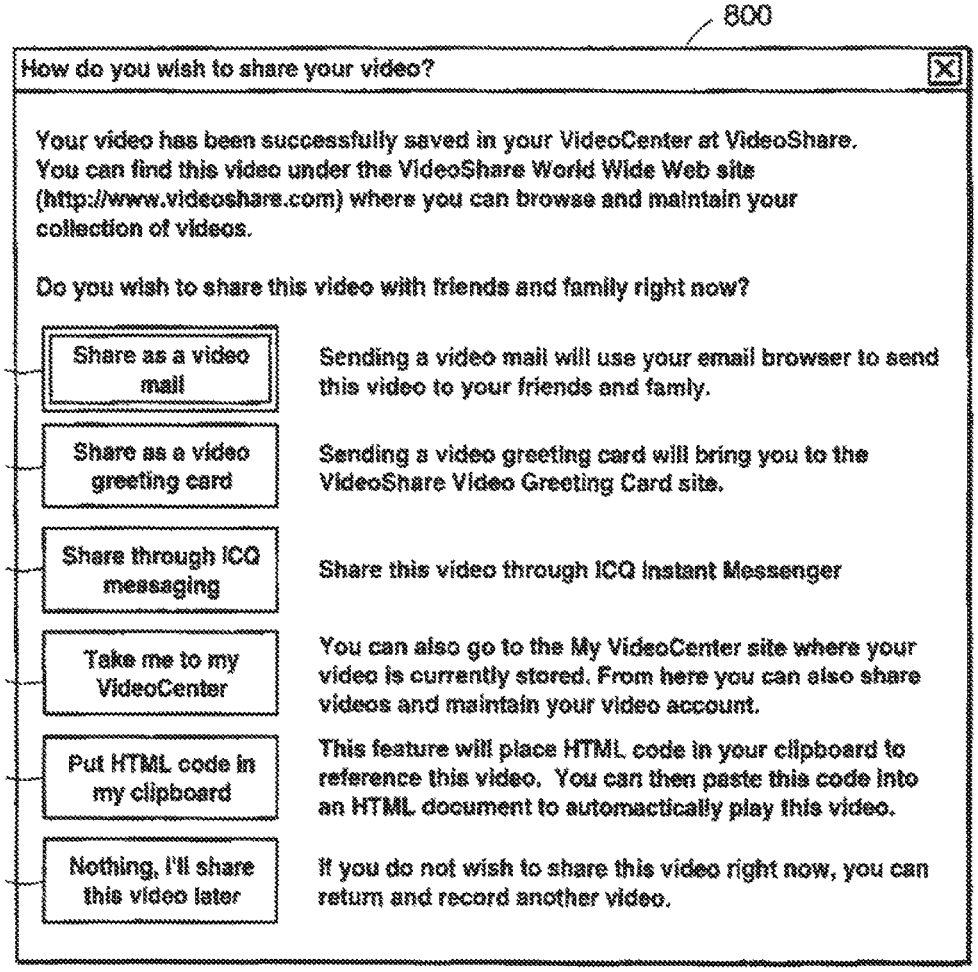
FIG. 8 is an interactive screen used to determine the desires of the individual who sends a video for storage.

FIG. 8 depicts a dialog panel 800 presenting several methods with which the user can distribute the uploaded streaming video segment and its associated identifiers to third party recipients. The dialog panel 800 prompts the user as to the possible selections that the user can elect.

In one embodiment, there are five possible methods to distribute the video file:

The user can elect to use an email browser to send an email to one or more people that includes a URL reference to the video located on the VideoShare web site. This also includes the further possibility to send the video player directly embedded inside the email message. This option is elected by activating the button 810, labeled "Share as a video mail."

The user can elect to share the video as a greeting card, bringing the user to the Video Greeting Card web page at the VideoShare web site. In this case, the user will also select features relating to the greeting card. The user can elect this option by activating the button 820, labeled "Share as a video greeting card."

The user can elect to send an ICQ URL message, automatically interfacing with ICQ's Instant Messenger software. The user can elect this option by activating the button 830 labeled "Share through ICQ Messaging."

The user can elect to go to the user's VideoCenter page on the VideoShare web site, from which location the video can also be shared or sent to others. The user can elect this option by activating the button 840, labeled "Take me to my VideoCenter."

The user can elect to place HTML code in the user's clipboard that references the video. This HTML code can be "pasted" into any Web page that supports HTML inserts. The user can elect this option by activating the button 850, labeled "Put HTML code in my clipboard." In one embodiment, this option allows a user to paste a video into a Web page, for example to demonstrate the use of a product for sale, or to present a personal greeting to visitors to the Web page.

By electing to activate the button 860, labeled "Nothing, I'll share this video later," the user can postpone making an election regarding the sharing of the uploaded video segment.

The above options are discussed in more detail below.

Sharing the video via email will bring up the user's default email browser, such as Outlook, Netscape Communicator, Eudora, etc. This is accomplished through the use of MAPI technologies that allow for document exchange on Win9x/2000 systems. A user who employs Netscape Communicator or Microsoft Outlook will be able to directly embed the Windows Media Player inside the email text body, allowing the recipient to directly play the video from his or her email browser. In one embodiment, this "embedded video mail" feature causes a window such as that depicted in FIG. 9 to appear, for example when the user is using Microsoft Outlook for e-mail service.

Figure 9:
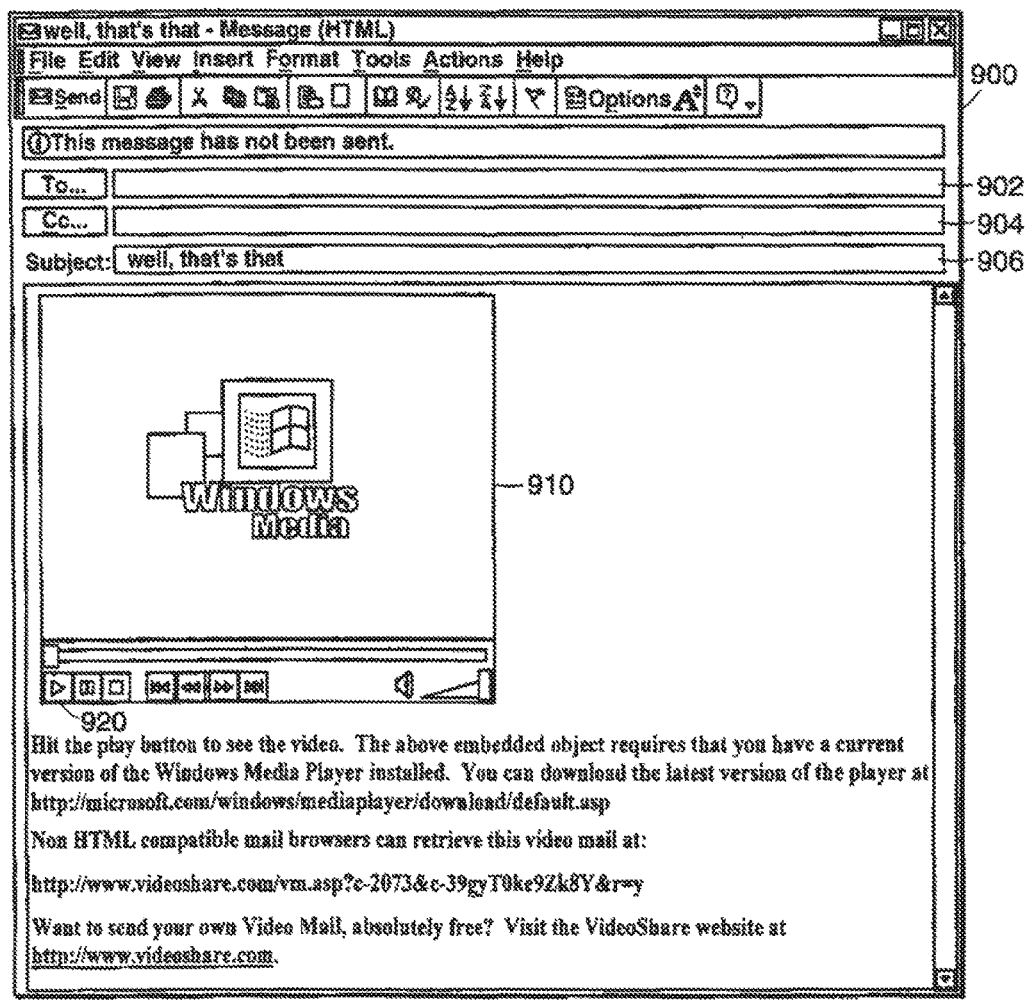
FIG. 9 is a video playback screen seen by the user.

As shown in FIG. 9, at the top of the email message, the VideoShare Producer 20 software will display the Windows Media Player 910 with the sender's recorded video preloaded. The recipient of this embedded video mail only needs to activate the play button 920 on the Windows Media Player to see the video segment, rather than going to a URL hyper-link. The embodiment includes the conventional dialog boxes for entry of an email address for a recipient (box 902), a "carbon copy" ("cc") address (box 904), and a subject (box 906). In the embodiment shown, instructions are presented below the Windows Media Player 910 for the convenience of the recipient.

The two options "Share as a Video Greeting Card" and "Take me to my VideoCenter" causes the VideoShare Producer 20 software to spawn off a Web browser and automatically—41—jump to one of these two pages on the VideoShare Web site. The user can define the features of a video greeting card, and can direct the card as an e-mail to a viewer. Alternatively, the user can define a recipient list for the video segment as a single item to be viewed, and can send the video to the locations on the list.

The "Share Through ICQ Messaging" button 830 can bring up ICQ's Instant Messenger software, if it is installed on the user's machine, and can initiate a "URL Message" construction automatically. The VideoShare Producer 20 software can automatically fill out the URL that references the playback of the user's video. The recipient of this URL Message can view the video by clicking a mouse on the URL to be taken directly to the VideoShare web site, where the video can be displayed.

The "Put HTML code in my clipboard" button 850 can place a section of HTML code that, when the user pastes this code in a web page, causes the Windows Media Player to automatically instantiate a video playback of the message. This feature enables the user to place this video in any system that supports HTML code, such as personal web pages, online auction sites, online job boards, and the like.

Working Offline and the "Sharing Queue"

The VideoShare Producer 20 software also allows the user to "work offline." Offline means that the VideoShare Producer 20 software will not communicate with the host computer 60 (for example, the VideoShare Upload/Database Server) until the user explicitly uploads one-or-more videos via a "Sharing Queue". This Sharing Queue appears to the user as one of the main tabs in the VideoShare producer 20 software and acts as a temporary queue for recorded/imported videos. "Work offline" allows the user to nor make an Internet connection until he or she is ready to upload more than one video at a time. This mode of operation is useful for modem users who incur considerable expense for extended dial-in times or people who are using laptops and are not always near an Internet connection outlet.

Figure 10:
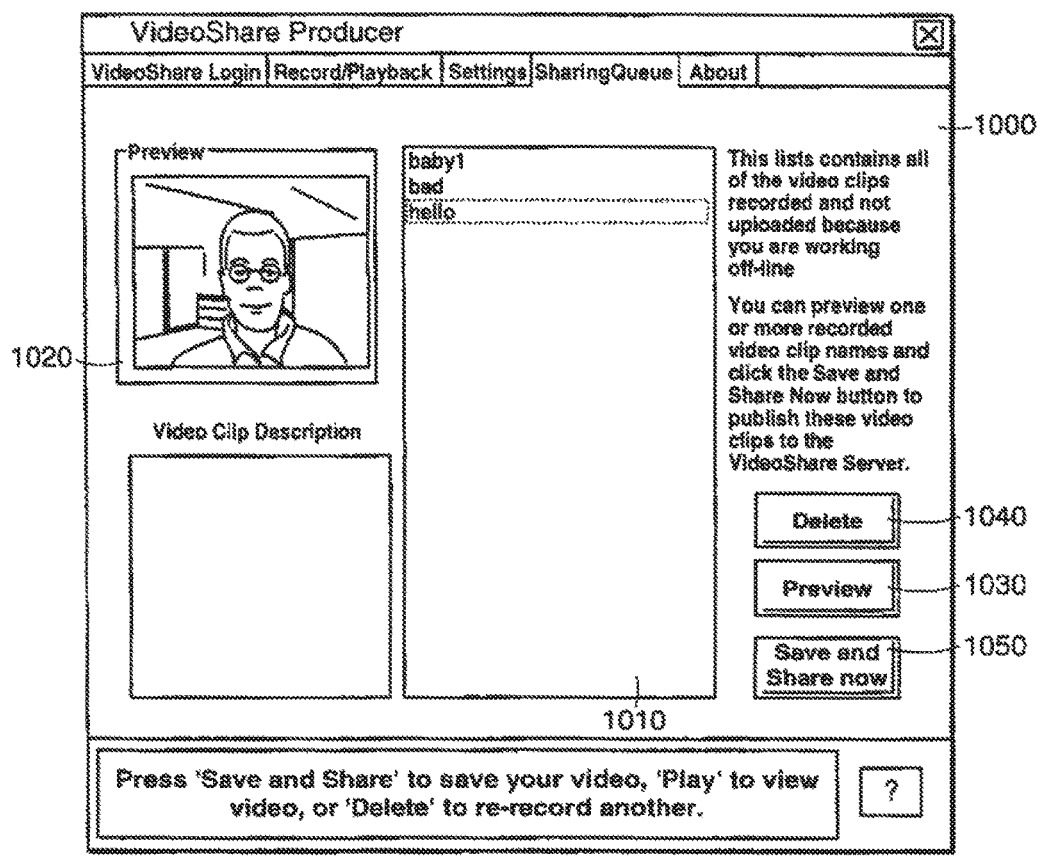
FIG. 10 is a screen used by the user to control the status of a video queue.

FIG. 10 shows a screen 1000 used to control the status of a video queue. When the user, after recording or importing a video, clicks the "Save and Share" button 536 of FIG. 5 while in "offline mode", the VideoShare Producer 20 software performs the first three steps of the "Save and Share Process," namely, the video file format conversion represented by box 615 of FIG. 6A, the compression of the video segment to a streaming multimedia format at a user-specified bitrate represented by the box 635 of FIG. 6A, and the creation of a "Thumbnail" JPEG snapshot of the video file represented by the box 640 of FIG. 6A. The resulting output files are stored in a local database for later use in the "Sharing Queue," which is an operation similar to the temporary storage of files depicted in FIG. 6A. In the middle of FIG. 10 is a dialog box 1010 that displays a list of video segments that are ready to be uploaded to the VideoShare Web site. The small "Preview" window 1020 in the upper left corner of FIG. 10 is a DirectShow playback graph that allows the user to review the stored video segment that is highlighted in the dialog box 1010. The user can use this window to preview the video segment file by activating the "Preview" button 1030, to delete the video segment file by activating the "Delete" button 1040, and to upload and publish the video by activating the "Save and Share Now" button 1050.

The "Save and Share Now" button 1050 performs the uploading process on each of the queued videos, creating a TCP/IP connection to the VideoShare Upload/Database Server, transferring the file to the VideoShare web site, and updating the user's VideoShare account, in a manner substantially similar to the method employed by the Save and Share button 536 of FIG. 5 to accomplish the same activities.

Audio/Video Setting Process

Figure 11:
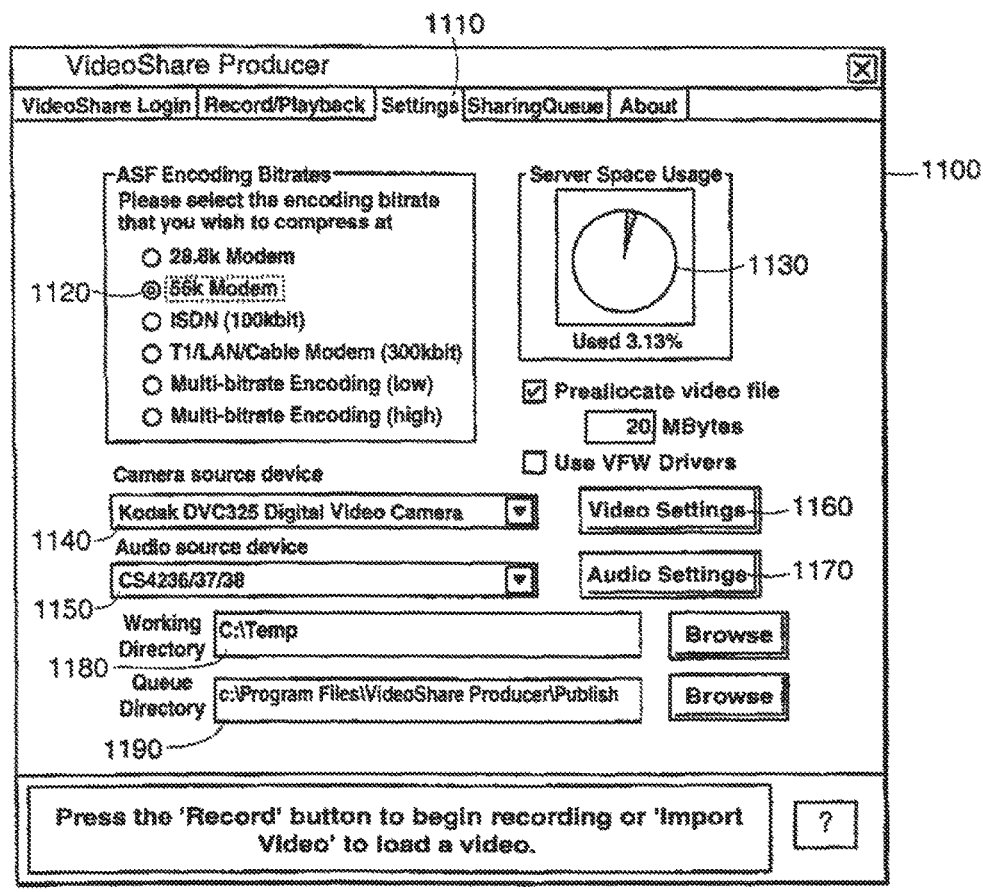
FIG. 11 is a screen used by the user to control the operational settings of equipment associated with the user's computer.

FIG. 11 shows a screen 1100 used to control the operational settings of equipment connected to the user's computer. Another feature of the VideoShare Producer 20 software the ability of the user to change the configuration of the audio, video, and compression devices through the use of the "Settings" tab 1110. Upon activation of the Settings tab 1110, the screen 1100 is active.

The user can select the "bitrate" at which the streaming multimedia files will be compressed by using the set of radio buttons 1120 at the upper left corner of the screen 1100. The default setting is "56 k Modem" which corresponds to a user using a 56 k modem. This default setting is denoted by the 56 k Modem radio button 1120 appearing with a dot, while the remaining radio buttons for bitrate 1120 are blank. In one embodiment, the pie graph 1130 that appears at the upper right corner of screen 1100 indicates the percentage of the user's VideoShare storage space that is full. In the embodiment shown, the user has filled approximately 3.13% of the available storage capacity available for storing files. Two pull-down menus, "Camera source device" box 1140 and "Audio source device" box 1150, list all of the available video and audio capture sources that the user has available on his or her Win9x/2000 machine. The user can select a source of audio or video by activating the appropriate pull-down menu box and locating a device of his or her choosing. To the right of these pull-down menus, there are two buttons, "Video Settings . . . " 1160 and "Audio Settings . . . " 1170 that allow the user to change the properties of the currently selected audio and video device. Such properties include image size, capture compression, lighting conditions, and the like. The screen 1100 also provides to the user the current working directory information in a the box 1180 and the current queue directory information in the box 1190, which the user can optionally change by entering new values in either or both boxes 1180 and 1190.

Interactive Advertisement Feature

Advertisers want to know how effective their advertisements are, and what response they are receiving from viewers. In normal commercial advertising in print media and in broadcast media, it is both difficult and expensive to try to gather such information. The interactive advertisement feature of the invention allows advertisers 30 to accurately track not only whether the ad video was watched by the viewer 92, but to do so in real time. In addition, there is no need to have individuals contact viewers 92 because systems and methods accordingly to the invention perform the function in an automated manner.

Systems and methods of the invention operate by pausing the ad and/or the video until a specific action is taken by the viewer 92. The action that the viewer 92 can be required to take can include clicking a button, activating a mouse or pointing device, using the mouse or pointing device to activate a link, answering a question, or striking a key (or a similar action) to take place within a time frame.

Once the specific action has been taken, the video or the advertisement will resume playing.

If the action is not taken, the ad can either time out and not play for that viewer 92, remains paused until the viewer 92 either takes the action or closes the ad, or continue playing to its end. By observing the responses of viewers, it is possible to obtain statistics about how many of the ad videos were watched in their entirety and how many timed out or were never fully viewed.

The benefits to advertisers 30 can include obtaining information about which of their advertisements were actually watched by the viewer 92. Advertisers can use such information to determine who is watching their advertisements, and how long those people watch a given advertisement.

While the invention has been particularly shown and described with reference to particular embodiments, it should be understood by those skilled in the art that various changes in form and detail may be made without departing from the spirit and scope of the invention as defined by the appended claims.

What is claimed is:

1. A method of sharing a streaming video and associated advertisement over a network, comprising:
   executing, by a first computer:
      receiving an advertisement;
      storing the advertisement;
      receiving a video file having any one video file format among a plurality of video file formats;
      converting the video file having the any one video file format into a first streaming video file having a first streaming video format and converting the video file having the any one video file format into a second streaming video file having a second streaming video format, independent from receiving a command to perform such conversions;
      storing the first streaming video file and the second streaming video file to a storage device;
      generating an identification tag identifying the stored first streaming video file;
      associating the first streaming video file with the advertisement;
      embedding the identification tag into a web page accessible to a plurality of users on the network;
      receiving, via a web page, a request to transmit the first streaming video file; and
      transmitting, via a web page, the first streaming video file and the advertisement to a second computer on the network.

2. The method of claim 1, wherein the identification tag comprises a video frame image selected from the video file, the video frame image representing a subject matter of the video file.

3. The method of claim 1, wherein the identification tag comprises a still image.

4. The method of claim 1, wherein the receiving the video file occurs via an upload form residing on a web page.

5. The method of claim 1, wherein the receiving the video file occurs via one of: an FTP upload; an HTTP post; an electronic mail; or an instant message.

6. The method of claim 1, wherein the advertisement is a video.

7. The method of claim 1, wherein the first computer comprises a plurality of computers.

8. The method of claim 1, wherein the network comprises one or more of: a cellular communication connection, a wire connection, or a wireless connection.

9. The method of claim 1, further comprising:
   converting the video file into three or more streaming video files having three or more streaming video formats.

10. The method of claim 1, further comprising:
    converting the first streaming video file into a third streaming video file having a third streaming video format.

11. The method of claim 1, further comprising:
    receiving a second advertisement.

12. The method of claim 1, wherein the first computer selectively associates the first streaming video file with an advertisement based on pre-determined criteria.

13. The method of claim 1, wherein the first streaming video file and the second streaming video file have different video quality.

14. The method of claim 1, wherein the converting the video file into the first streaming video file includes data compression of the video file and the converting the video file into the second streaming video file includes data compression of the video file.

15. The method of claim 1, wherein the first streaming video file is compressed to a bit rate specified by an individual or compressed to a bandwidth that is required to view the first streaming video without disruption.

16. The method of claim 1, further comprising:
    removing temporary files, that were created during the executing performed by the first computer, from a hard drive of the first computer.

17. The method of claim 1, further comprising:
    converting the video file into a third streaming video format,
    wherein the transmitting to the second computer on the network includes transmitting the first streaming video file, the second streaming video file, and the third streaming video file in association with the identification tag to the second computer on the network.

18. The method of claim 1, further comprising:
    automatically discriminating, by the second computer, transmission speed capabilities of hardware of a computing device of a user, from among the plurality of users on the network, desiring to view the video file.

19. A system for sharing a streaming video and associated advertisement over a network, comprising:
    a first computer for receiving an advertisement;
    a storage device for storing the advertisement;
    a second computer for receiving a video file having any one video file format among a plurality of video file formats;
    a third computer for converting the video file having the any one video file format into a first streaming video file having a first streaming video format and converting the video file having the any one video file format into a second streaming video file having a second streaming video format, independent from receiving a command to perform such conversions;
    a fourth computer for storing the first streaming video file and the second streaming video file to a storage device;
    a fifth computer for generating an identification tag identifying the stored first streaming video file;
    a sixth computer for associating the first streaming video file with the advertisement;
    a web page accessible to a plurality of users on the network;
    a seventh computer for embedding the identification tag into the web page accessible to a plurality of users on the network;
    an eighth computer for receiving a request to transmit the first streaming video file; and
    a ninth computer for transmitting, via a web page, the first streaming video file and the advertisement to a tenth computer on the network.

20. The system of claim 19, wherein two or more of the first computer, second computer, third computer, fourth computer, fifth computer, sixth computer, seventh computer, eighth computer and ninth computer are part of the same computer.

21. The system of claim 19, wherein one or more of the first computer, second computer, third computer, fourth computer, fifth computer, sixth computer, seventh computer, eighth computer and ninth computer comprise a plurality of computers.

22. A system for sharing a streaming video and associated advertisement over a network, comprising:
one or more first computers configured to:
receive an advertisement;
store the advertisement;
receive a video file having any one video file format among a plurality of video file formats;
convert the video file having the any one video file format into a first streaming video file having a first streaming video format and converting the video file having the any one video file format into a second streaming video file having a second streaming video format, independent from receiving a command to perform such conversions;
store the first streaming video file and the second streaming video file to a storage device;
generate an identification tag identifying the stored first streaming video file;
associate the first streaming video file with the advertisement;
embed the identification tag into a web page accessible to a plurality of users on the network;
receive, via a web page, a request to transmit the first streaming video file; and
transmit, via a web page, the first streaming video file and the advertisement to a second computer on the network.

23. The system of claim 22, wherein the one or more first computers are configured to selectively associate the first streaming video file with an advertisement based on predetermined criteria.

24. The system of claim 22, wherein the first streaming video file and the second streaming video file have different video quality.

25. The system of claim 22, wherein conversion of the video file into the first streaming video file includes data compression of the video file and conversion of the video file into the second streaming video file includes data compression of the video file.

26. The system of claim 22, wherein the one or more first computers are configured to compress the first streaming video file to a bit rate specified by an individual or compress the first streaming video file to a bandwidth that is required to view the first streaming video without disruption.

27. The system of claim 22, wherein the one or more first computers are configured to remove temporary files, that were created during creation of the first streaming video file and the second streaming video file, from a hard drive.

28. The system of claim 22, wherein the one or more first computers are configured to transmit the first streaming video file, the second streaming video file, and a third streaming video file that was created from the video file to the second computer on the network in association with the identification tag to the second computer on the network.

29. The system of claim 22, wherein the second computer is configured to automatically discriminate transmission speed capabilities of hardware of a computing device of a user, from among the plurality of users on the network, desiring to view the video file.

30. The system of claim 22, wherein the one or more first computers are configured to convert the video file into three or more streaming video files having three or more streaming video formats.

* * * * *